US010544670B2

(12) United States Patent
Hay

(10) Patent No.: US 10,544,670 B2
(45) Date of Patent: Jan. 28, 2020

(54) RELUCTANCE SENSOR FOR MEASURING A MAGNETIZABLE STRUCTURE IN A SUBTERRANEAN ENVIRONMENT

(71) Applicant: Halliburton Energy Services, Inc., Houston, TX (US)

(72) Inventor: Richard Thomas Hay, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 194 days.

(21) Appl. No.: 15/311,829

(22) PCT Filed: Jun. 17, 2014

(86) PCT No.: PCT/US2014/042619
§ 371 (c)(1),
(2) Date: Nov. 16, 2016

(87) PCT Pub. No.: WO2015/195089
PCT Pub. Date: Dec. 23, 2015

(65) Prior Publication Data
US 2018/0038218 A1    Feb. 8, 2018

(51) Int. Cl.
*E21B 47/092* (2012.01)
*E21B 47/024* (2006.01)
(Continued)

(52) U.S. Cl.
CPC .............. *E21B 47/024* (2013.01); *E21B 7/04* (2013.01); *E21B 44/00* (2013.01); *E21B 49/00* (2013.01); *G01V 3/26* (2013.01); *E21B 47/12* (2013.01)

(58) Field of Classification Search
CPC ....................... E21B 47/0905; E21B 47/02216
See application file for complete search history.

(56) References Cited

U.S. PATENT DOCUMENTS 5,230,387 A    7/1993  Waters et al.
5,589,775 A *  12/1996  Kuckes ............ E21B 47/02216
                                                            166/66.5
(Continued)

FOREIGN PATENT DOCUMENTS

EA    200400234    8/2004
EP    1995406      11/2008
(Continued)

OTHER PUBLICATIONS

International Search Report and Written Opinion of PCT Application No. PCT/US2014/042619 dated Mar. 18, 2015: pp. 1-12.

*Primary Examiner* — Brad Harcourt
*Assistant Examiner* — Steven A MacDonald
(74) *Attorney, Agent, or Firm* — Chamberlain Hrdlicka

(57) ABSTRACT

A drilling apparatus, sensor, system and method. The drilling apparatus includes a drill bit and a steering controller that steers the drill bit. The drilling apparatus includes a reluctance sensor system that measures changes in magnetic flux. The reluctance sensor includes two or more magnets creating a bucking effect. The drilling apparatus includes a processor in communication with the reluctance sensor that receives the measurements made by the reluctance sensor to determine a distance or direction to a target object. The distance is utilized by the steering controller to steer the drill bit.

13 Claims, 19 Drawing Sheets

(51) Int. Cl.
*G01V 3/26* (2006.01)
*E21B 7/04* (2006.01)
*E21B 44/00* (2006.01)
*E21B 49/00* (2006.01)
*E21B 47/12* (2012.01)

(56) References Cited

U.S. PATENT DOCUMENTS

| | | | |
|---|---|---|---|
| 5,818,352 A * | 10/1998 | McClure | E21B 47/122 340/854.6 |
| 6,900,640 B2 | 5/2005 | Fanini et al. | |
| 7,219,748 B2 | 5/2007 | Gao et al. | |
| 7,268,556 B2 | 9/2007 | Fanini et al. | |
| 7,321,293 B2 * | 1/2008 | Kennedy | E21B 47/02216 175/40 |
| 7,816,923 B2 | 10/2010 | McElhinney | |
| 8,026,722 B2 | 9/2011 | McElhinney | |
| 2006/0028321 A1 * | 2/2006 | Kennedy | E21B 47/02216 340/385.1 |
| 2007/0206555 A1 * | 9/2007 | Kruspe | E21B 47/022 370/338 |
| 2008/0000686 A1 * | 1/2008 | Kuckes | E21B 47/02216 175/24 |
| 2008/0041626 A1 * | 2/2008 | Clark | E21B 47/02216 175/45 |
| 2011/0133741 A1 | 6/2011 | Clark | |
| 2011/0278067 A1 | 11/2011 | Clark | |
| 2011/0309836 A1 | 12/2011 | Bittar et al. | |
| 2012/0139543 A1 | 6/2012 | McElhinney et al. | |
| 2013/0056272 A1 | 3/2013 | Kuckes | |
| 2013/0069655 A1 | 3/2013 | McElhinney et al. | |
| 2013/0173164 A1 | 7/2013 | Zhang | |
| 2013/0292176 A1 | 11/2013 | Ekseth et al. | |
| 2015/0021029 A1 * | 1/2015 | Abrant | E21B 29/06 166/298 |

FOREIGN PATENT DOCUMENTS

| | | |
|---|---|---|
| WO | 2006012731 | 2/2006 |
| WO | 2012009375 | 1/2012 |
| WO | 2012068219 | 5/2012 |
| WO | 2012134468 | 10/2012 |

* cited by examiner

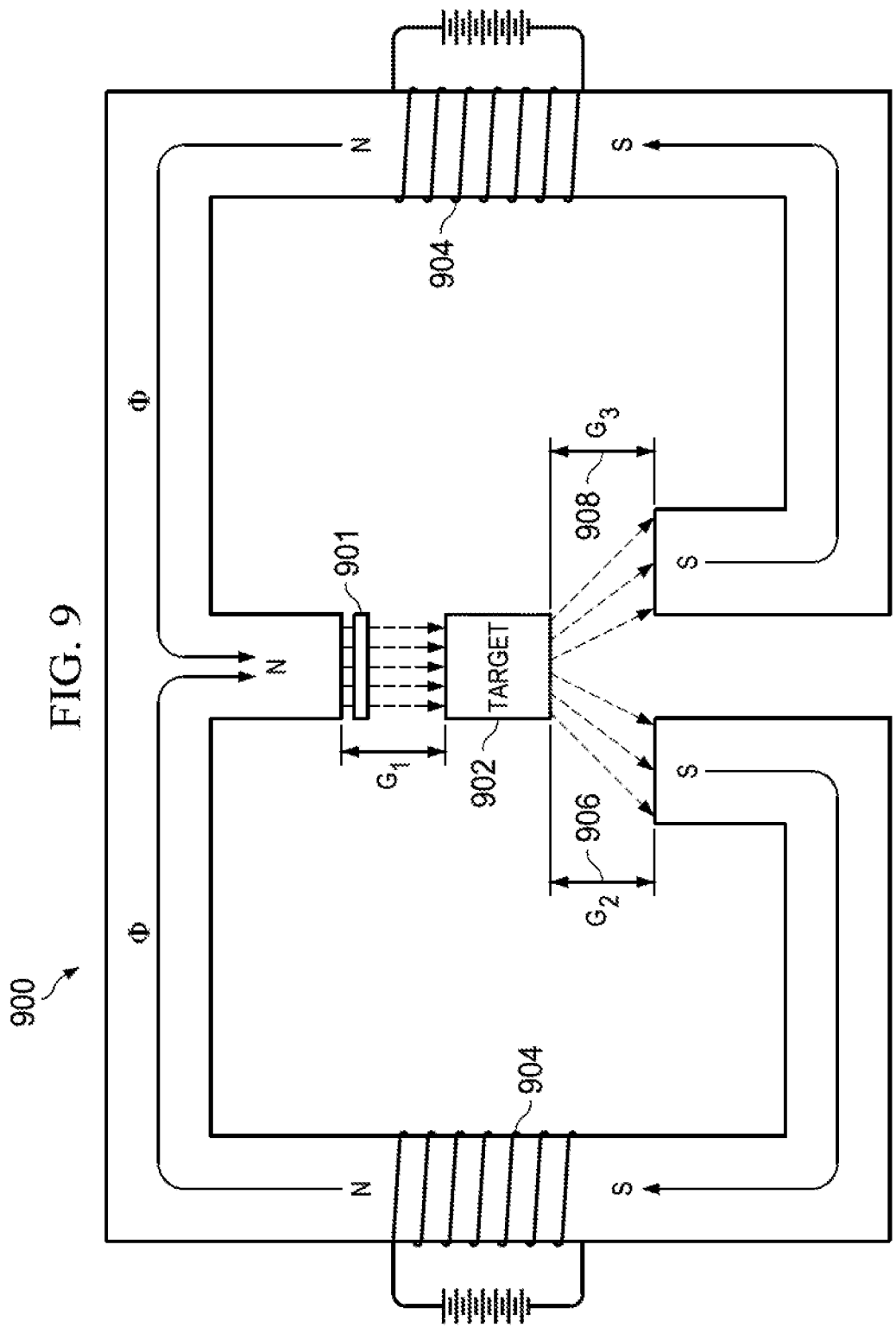

RELUCTANCE SENSOR FOR MEASURING A MAGNETIZABLE STRUCTURE IN A SUBTERRANEAN ENVIRONMENT

BACKGROUND

Sensory processes for determining proximity to magnetic structures, fields, or magnetic anomalies have improved significantly in recent years. During natural resource exploration, sensory measurements may be utilized to intercept various devices or components, determine capacity, make predictions, and implement exploration actions. In some cases, making measurements may require bulky sensor devices that may be difficult to operate, inaccurate, expensive, and complicated.

BRIEF DESCRIPTION OF THE DRAWINGS

Illustrative embodiments of the present invention are described in detail below with reference to the attached drawing figures, which are incorporated by reference herein and wherein:

FIG. 9 is a schematic, circuit representation of a sensor system in accordance with the disclosed embodiments;

DETAILED DESCRIPTION OF THE DRAWINGS

Figure 1:
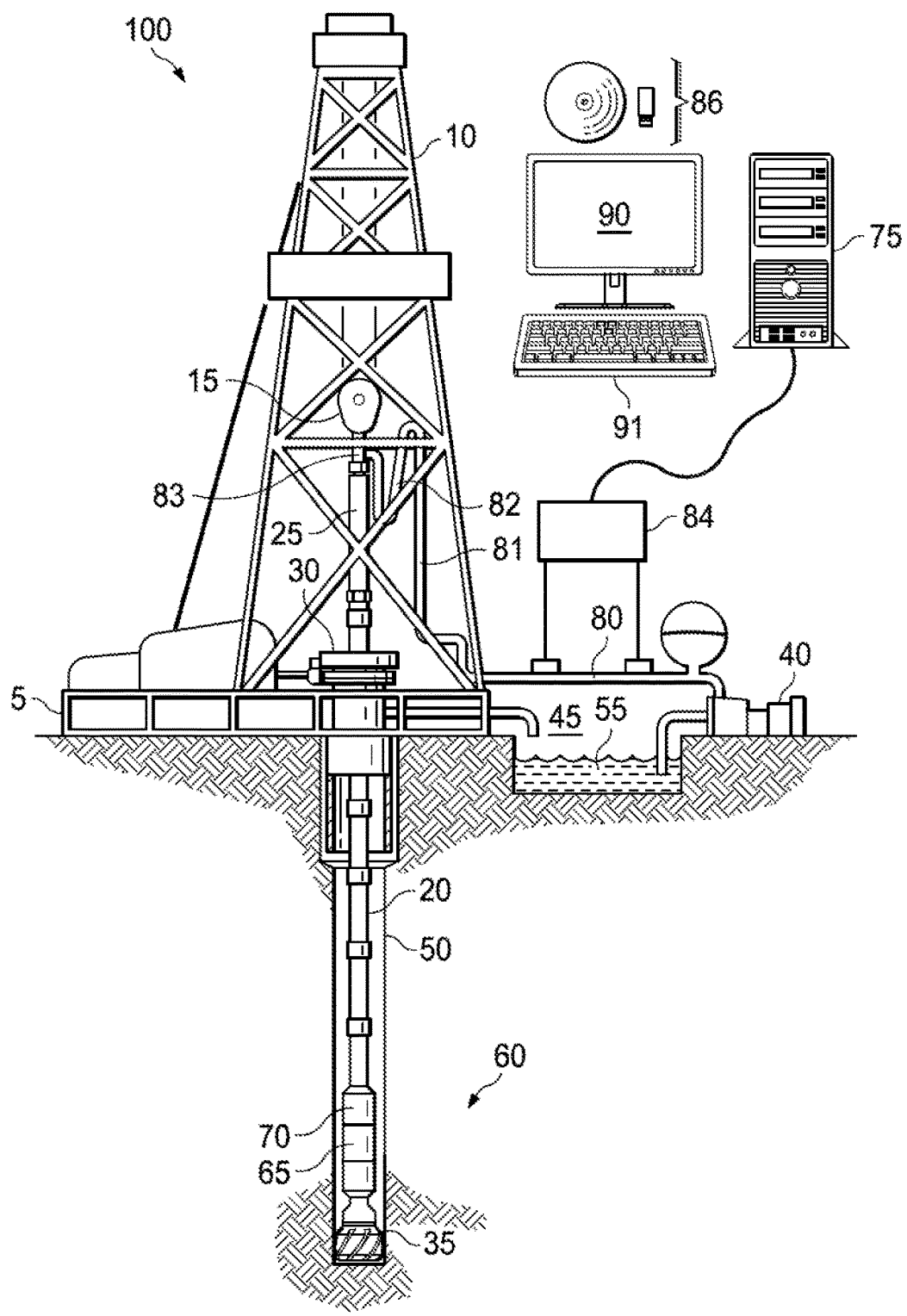
FIG. 1 is a schematic representation of a logging-while-drilling (LWD) environment in accordance with the disclosed embodiments.

The illustrative embodiments provide a sensor system, method, and drilling tool or apparatus for measuring or detecting a magnetizable structure in a subterranean environment. The illustrative embodiments may be utilized to intersect a well, such as when a relief well is drilled to intersect with a blowout well in order to disable or fix the blowout well. The illustrative embodiments may also be utilized to avoid intersecting with wells that are in close proximity to one another, such as in an offshore platform environment where wells may be closely spaced together. In one embodiment, the embodiments may measure the change in magnetic reluctance with respect to an azimuthal direction around the circumference of the embodied systems or tools. The illustrative embodiments may also be utilized to perform ranging within or outside of a wellbore. For example, the sensor system may determine the distance between the tool and the sides of the casing, detect branch locations, and measure casing wall thickness. As used herein, "or" does not require mutual exclusivity.

In one embodiment, the sensor of the illustrative systems may be a magnetometer. However, the sensors may represent one or more magnetometers, gaussmeters, flux gate, gradiometers, Hall effect sensors, coil loops, or other sensors configured to detect or measure the strength or intensity of magnetic fields (or changes in the strength or intensity of the magnetic fields). A magnetometer measures the magnetic field strength while the magnetic gradiometer measures the rate of change of the magnetic field strength (e.g., dB/dr) as a spatial derivative. For example, the gradiometers may measure a difference in magnetic field strength in different radial positions (e.g., dB=B2−B1, dr=r2−r1), such as preselected radial distances. In one embodiment, the values measured by the gradiometers may be the difference in the magnetic field strength measured by two magnetometers divided by a separation distance. The magnetometers may be positioned to have their sense axis and orientation in the same direction. In other embodiments, an array of sensors may be utilized to provide more accurate results and for redundancy in the event of a failure. In one embodiment, the magnetometer measures the magnetic field strength that is incident in the selected radial direction.

As described herein, the illustrative embodiments may utilize one or more reluctance sensors including magnetometers or gradiometers. Reluctance sensor systems may include one or more permanent magnets. For example, the sensors as noted above may include coils or windings to detect a change in the magnetic field generated by the permanent magnet. The rotation of the sensor may be utilized to detect changes in the magnetic flux to detect speed, direction, and position of target devices. The target devices may represent ferrous metal or magnetic targets. Sensing is performed without contacting the target (until desired).

The illustrative embodiments may have numerous benefits improvements over existing systems. In one embodiment, the sensor system may not require current to flow on the target well or components. This may be particularly important for areas with large amounts of salt formations. Salt formations make active excitation very difficult. As a result, in highly resistive formations, the sensor system may guide the drilling tool to a desired intersection. Less parts may be required as the transmitter and receiver for ranging coexist in the same location on the bottom hole assembly. The various embodiments have a number of low-power applications. The use of bucking magnets and magnetometers may provide for a radial azimuthal sensitivity similar to more expensive and complex tools. In other embodiments, the sensor system may be utilized to measure casing wear, be a multilateral window finder, provide casing collar location, and provide a milling profile.

The illustrative embodiments provide a highly accurate directional and distance measurement of nearby magnetizable structures in order to avoid, follow in close proximity, or intersect target wells, devices, components, earth formations, or so forth. The illustrative embodiments may be utilized to steer a relief well to intersect with the target well in the form of active excitation. In one embodiment, the sensor system may be utilized with a standard or steerable drill bit. In other embodiments, the sensor system may be utilized as part of a logging tool.

Distance measurements performed by the sensor system may be determined in any number of ways. In one embodiment, a model reference may be utilized to determine how much of a magnetization field intensity and the magnetization field orientation may be created for a given structure based on the shape of the structure and the magnetic permeance of the material the structure is made of. The measured results may be compared against the expected results to determine proximity, orientation, or configuration of the sensed structure. The system may also determine distance by measuring the magnetic field gradient of the magnetized object that is superimposing itself on the permanent magnetic field. The sensor system may also measure the change in magnetic intensity as the downhole tool draws near or veers away from the magnetizable object. The sensor system may also determine distance by measuring the magnetic intensity over a neutral environment. In another embodiment, the sensor system may impose a smaller AC excitation field on top of the reluctance field (preferably in the same bucking format) using opposing windings on each magnet. This form of active ranging may also be utilized in conjunction with a static magnetic field from a permanent magnet. The illustrative embodiments may also use any number of structures or devices to magnify, channel, manage, or otherwise affect the magnetic field.

FIG. 1 shows an illustrative logging-while-drilling environment (LWD) 100. LWD may also be referred to as measurement-while-drilling (MWD). A drilling platform 5 is equipped with a derrick 10 that supports a hoist 15. The rig operator drills an oil or gas well for production or exploration using a string of drill string 20. The hoist 15 suspends a top drive 25 that rotates the drill string 20 as it lowers the drill string 20 through the wellhead 30. Connected to the lower end of the drill string 20 is a drill bit 35. The drill bit 35 is rotated and drilling accomplished by rotating the drill string 20, by use of a downhole motor near the drill bit 35 or the top drive 25, or Kelly pipe and rotary table (not shown) or by both methods.

In one embodiment, recirculation equipment 40 pumps drilling mud or other fluids through the flow line 80 to the derrick 10 and goes up the derrick 10 through a stand pipe 81 then connects to a swivel 83 on the top drive via a flexible hose 82 to permit fluid to be pumped through the top drive 25 and into the drill string 20 below, through top drive 25, and down through the drill string 20 at high pressures and volumes to emerge through nozzles or jets in the drill bit 35. The drilling fluid then travels back up the hole via the annulus formed between the exterior of the drill string 20 and the borehole wall 50, through a blowout preventer, through a return line 45 and into a retention pit 55, reservoir, or enclosed receptacle on the surface. On the surface, the drilling fluid may be cleaned and then recirculated by the recirculation equipment 40. The drilling fluid may be utilized to carry cuttings from the base of the bore to the surface and balance the hydrostatic pressure in the rock formations in the LWD environment 100.

The bottom hole assembly 60 (i.e., the lowermost part of drill string 20) may include thick-walled tubulars called drill collars, which add weight, stability, and rigidity to aid the drilling process. The thick walls of these drill collars make them useful for housing instrumentation, tools, and LWD sensors. For example, the bottom hole assembly 60 of FIG. 1 may include a sensor system 65 (also referred to as a reluctance sensor) and a communications and control module 70.

The sensor system 65 may include a number of permanent magnets and coils configured to sense changes in the magnetic field when the sensor system 65 is within the proximity of ferromagnetic materials, paramagnetic materials, magnetic earth formations (e.g., pyrite, paramagnetic shale, etc.), or other components affected by magnetic fields. The sensor system 65 may be encompassed in a downhole tool or sub. In one embodiment, the sensor system 65 does not include magnetic materials to avoid affecting the readings taken by the sensor system 65. Typical materials for the sensor system 65 may include many forms of austenitic stainless steels In one embodiment, the sensor system 65 is a reluctance sensor that is positioned as close to the drill bit 35 as possible or integrated with the drill bit 35 including such positions as on the face of a polycrystalline diamond compact (PDC) drill bit or in the cutter component. In other embodiments, the sensor system 65 may be part of the drill string 20 that sits just above the drill bit 35. Various configurations of a drill string 20 and sensor system 65 are shown in FIGS. 4-7. The sensor system 65 may be useful for taking measurements in highly resistive formations, such as salt formations where existing active excitation tools are not as effective.

In addition, the sensor system 65 or bottom hole assembly 60 may include, without limitation, a natural gamma ray detector, a resistivity tool, a nuclear magnetic resonance tool, a neutron porosity tool, or other exploration formation descriptor tools and sensors. Other tools and sensors may also be included in the bottom hole assembly 60 or sensor system 65, including, but not limited to, position sensors, orientation sensors, accelerometers, compasses, pressure sensors, temperature sensors, vibration sensors, and so forth.

From the various bottom hole assembly 60 sensors, the communications and control module 70 (telemetry module) collects data regarding the formation properties or various drilling parameters, tool configurations and readings, from the sensor system 65 and stores the data in internal memory. In addition, some or all of the data may be transmitted to the surface by wireline communications, wireless communications, magnetic communications, seismic communications, mud telemetry, or so forth.

For example, the communications and control module 70 may communicate information to the surface. The communications signals may be received by a surface receiver 84, converted to an appropriate format, and processed into data by one or more computing or communications devices, such as computer 75. As used herein, computing devices such as computers may comprise one or more central processing units (CPU) or hardware or software control logic communicably coupled to a storage device, such as a hard disk, random access memory, magnetic RAM (MRAM) or other forms of non-volatile memory, that contains a set of processor executable instructions or software.

In certain embodiments, the set of software may be stored on a portable information storage media 80—such as thumb drives, CDs, DVRs, etc.—and later stored within the computer 75 or executed from the portable information storage media. The computer 75 may also receive user input via an input device 91, such as a keyboard, mouse pointer and mouse buttons, microphone, or other device to process and decode the received signals. The resulting sensory and telemetry data may be further analyzed and processed by computer 75 to generate a display of useful information on a computer monitor 90 or some other form of a display device or output, such as a mobile device like a hand held smart phone or a tablet PC. For example, a driller may employ the system of the LWD environment 100 to obtain and view ranging, intersection, or magnetic field information for the borehole wall 50 or downhole components, structures, or formations.

Figure 2:
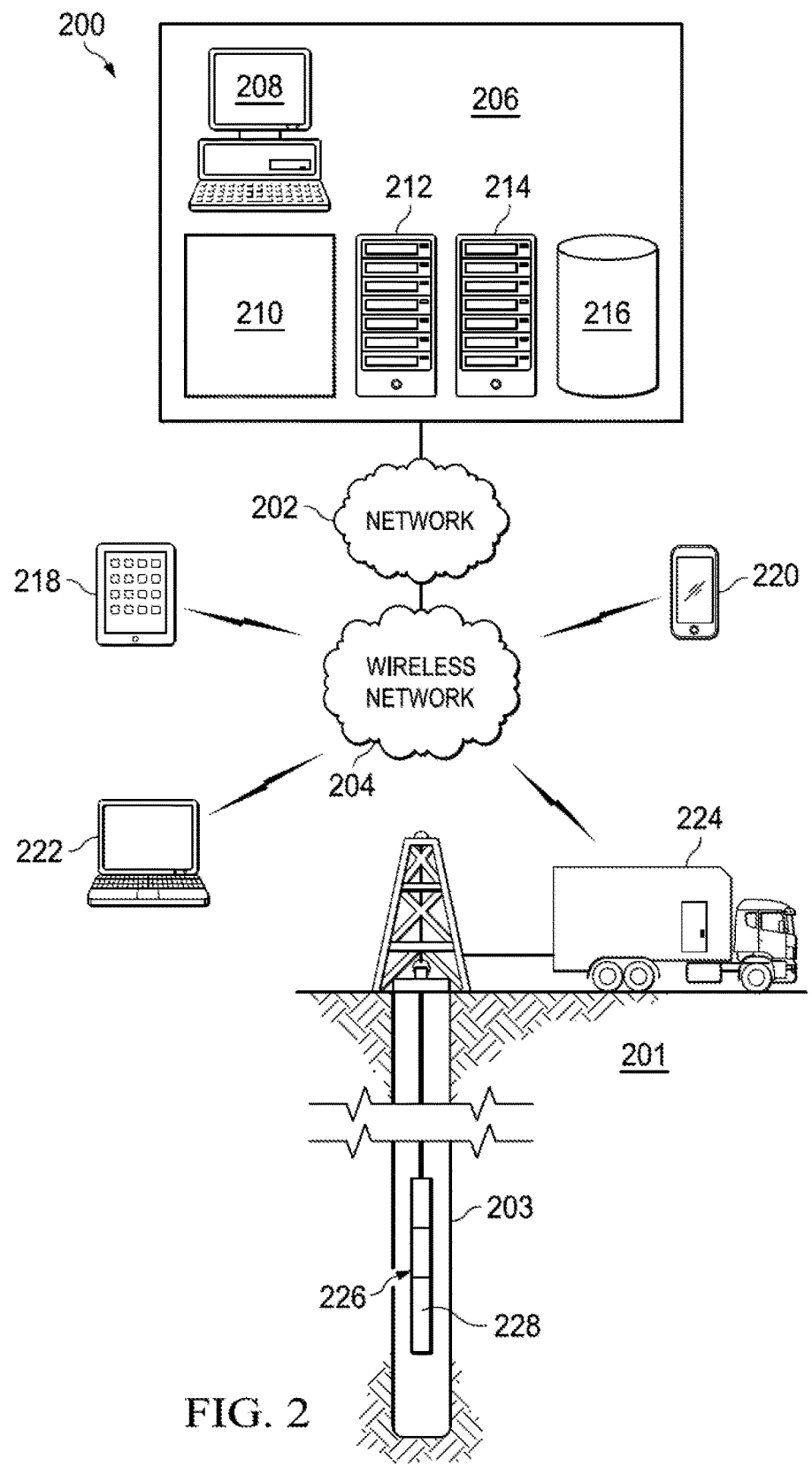
FIG. 2 is a schematic, pictorial representation of a logging environment in accordance with the disclosed embodiments.

FIG. 2 is a schematic, representation of a logging environment 200 in accordance with the disclosed embodiments. The logging environment 200 may include any number of tools, devices, locations, systems, and equipment that may be utilized to provide the sensor tools, systems, and methods herein described. The logging environment 200 may also include a reservoir 201.

As previously noted, the reservoir 201 is a designated area, location, or three-dimensional space that may include natural resources, such as crude oil, natural gas, or other hydrocarbons. The reservoir 201 may include any number of formations, surface conditions, environments, structures, or compositions. The illustrative embodiments may utilize sensors to determine properties and measurements of the reservoir 201 and a wellbore 203 penetrating the reservoir. For example, changes in the magnetic flux may be utilized to measure parameters (e.g., distances, direction, casing thicknesses, casing magnetic permeance, etc.), properties, structures or formations, deposits, downhole tools or components, or other properties of the reservoir 201 and the wellbore 203. The permeance, reluctance, or other related parameters may be similarly utilized. For example, a distance to the wellbore walls may be determined utilizing the changes in the magnetic flux. Processing or computations utilizing the magnetic flux density may be performed downhole, on-site, off-site, at a movable location, at a headquarters, utilizing fixed computational devices, utilizing wireless devices, or over a data network using remote computers in real-time or for later after the fact processing.

The data and information determined from examination of the wellbore 203 may be utilized to perform measurements, analysis, or actions for exploration or production of the reservoir 201. The wellbore 203 may be drilled and configured with the reservoir 201 to extract wellbore fluids or gases from the formation. The size, shape, direction, and depth of the wellbore 203 may vary based on the conditions and estimated natural resources available. The wellbore 203 may include any number of support structures or materials, divergent paths, surface equipment, or so forth.

In one embodiment, the processes herein described may be performed utilizing specialized sensor tools, including reluctance sensors, induction proximity sensors, resistivity sensors, magnetic field sensors, acoustic proximity sensors, location sensors (e.g., that permit the measurement of a distance or direction to a manmade subterranean structure), orientation sensors (e.g., gyroscopes, compasses, accelerometers, etc.) logic, interconnects, power sources, and other similar electrical components. The logic utilized by the tools may include processors, controllers, memories, field programmable gate arrays (FPGAs), batteries, wires, leads, pins, connectors, amplifiers, application specific integrated circuits, computer instructions, code, programs, or applications, or any combination of software, hardware, and firmware.

In one embodiment, the logging environment 200 may include a network 202, a wireless network 204, a facility 206, a computer 208, a management system 210, servers 212 and 214, a database 216, a tablet 218, a wireless device 220, a portable computer 222, and a mobile computing system 224. The mobile computing system 224 may be any computer system where one or more components of the system are portable, i.e., not permanently fixed in one geographical location, and may include one or more databases, tablets, wireless devices or computers. The mobile computing system 224 may be in direct or indirect communications with the downhole equipment 226 and/or tool 228 by use of a computing or communications network. In one embodiment, the mobile computing system 224 communicates with the downhole equipment 226 and/or tool 228 by use of the network 202. The network 202 may be any type of computing or communications network including one or more of the following networks: a wide area network, a local area network, one or more private networks, the Internet or public networks, a telephone network (e.g., publicly switched telephone network), a cable network, a satellite network, one or more cellular networks, cloud networks, virtual networks, and other wireless and data networks.

The wireless network 204 is one example of a wireless network for regional or local communications (e.g., WiFi, GMS, 4G, LTE, PCS, Bluetooth, Zigbee, WiMAX, GPRS, etc.). The network 202 and the wireless network 204 may include any number of network nodes, devices, systems, equipment, and components (not depicted), such as routers, servers, network access points/gateways, cards, lines, wires, switches, DNS servers, proxy servers, web servers, and other network nodes and devices for assisting in routing and computation of data/communications as herein described.

In another embodiment, integrated or external tools or components communicating with the mobile computing system 224 may be configured to penetrate an earth formation through the wellbore 203 to stimulate, energize, and measure parameters of a formation or a nearby man made structure. One or more sensors or logging tools (e.g., probes, drill string measurement devices, nuclear magnetic resonance imagers, etc.) may be integrated with or connected to the downhole equipment 226 and tool 228 communicating with the mobile computing system 224 to perform signal generation, measurements, logging, data retrieval, data storage, processing, and information display.

For example, the mobile computing system 224 may determine any number of static and dynamic properties of the reservoir 201. The static and dynamic properties may include measurements of or changes in pressure, wellbore distances and diameters, ranges, depth, temperature, composition (e.g., hydrocarbon composition levels, measurements, and statistics), fluid flow rate, fluid composition, density, porosity, position and displacement, depth, and so forth. Changes or variations in how the formations within the reservoir 201 or wellbore 203 affect the magnetic flux of the tool 228 may be utilized to make any number of determinations regarding the natural formations, structures, or man-made components within the reservoir 201.

For example, at various times during the drilling process, a drill string (see FIG. 1) may be removed from the wellbore 203. Once the drill string has been removed, logging operations may be conducted using the tool 228 which may be a wireline or wireless tool. For example, the tool 228 may be a sensing instrument suspended by a cable having conductors for transporting power to the tool and telemetry from the tool to the surface. The tool 228 may be preconfigured for testing or configured in real-time for the conditions of the logging environment. The tool 228 may be configured to operate with or without rotation.

The tool 228 may alternatively represent any number of LWD, MWD, seismic-while-drilling (SWD), or other downhole or reservoir tools. In one embodiment, the tool 228 may rotate one or more sensors to enhance measurements made by the tool 228. The tool 228 may store or communicate the signals and data generated as measured by changes in the magnetic flux to determine proximities to components or properties in each section of the reservoir 201 or the wellbore 203. The tool 228 may be self-contained and powered or connected to one or more fixed or mobile stations, systems, devices, equipment, or vehicles at the surface.

In one embodiment, the tool 228 or other portions of the mobile computing system 224 may communicate one or more magnetic fields from the tool 228. The magnetic field utilized by the tool 228 to perform measurements may be generated by the tool 228 or by any number of devices in close proximity to the tool 228. One or more of the computer 208, tablet 218, wireless device 220, portable computer 222, or mobile computing system 224 may execute a software program to configure the tool 228 and retrieve and utilize the measurements acquired in the process herein described. For example, in one embodiment the wireless device 220 may be configured to increase or decrease the amplitude, bucking effect, sensitivity, or other parameters utilized by the tool 228. The tool 228 may also be configured with programs or algorithms for self-configuration based on applicable environments, parameters, conditions, or so forth.

The wireless device 220 may also be utilized to filter particular types of fields, turn the tool (in any of three dimensions), or so forth.

In another embodiment, the computations and analysis of the data read by the tool 228 may be performed by an information handling system. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. For the purposes of this disclosure, computer-readable media may include any instrumentality or aggregation of instrumentalities that may retain data and/or instructions for a period of time. Computer-readable media may include, for example, without limitation, storage media such as a direct access storage device a hard disk drive or floppy disk drive)), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In one presented in embodiment of FIG. 2, the computations and analysis of the data read by the tool 228 may be performed by an information handling system which includes a management system 210, servers 212 and 214, or other network devices.

For example, the user may submit information and parameters utilizing the wireless device 220, personal computer 208, tablet 218, portable computer 222, or mobile computing system 224 to perform the calculations on the server 212 with the results being stored in the database 216 for subsequent access. The database 216 may store the depths and locations of components, sensor orientation information, casing thicknesses, static properties, dynamic properties, parameters, configuration, settings, and so forth. The database 216 may be accessed by any number of users and devices in the logging environment 200 to retrieve and update the data.

In one embodiment, the servers 212 and 214 may execute an application that is available to any of the devices of the logging environment 200 through the network 202 and the wireless network 204. For example, the application may display a user interface for receiving parameters, properties, and other information for configuring the tool 228 or reviewing the measurements of the tool 228. In one embodiment, the server 214 is a Web server that hosts the application for downhole measurement processing that is accessible through one or more browsers utilized by any of the personal computer 208, tablet 218, wireless device 220, portable computer 222, and mobile computing system 224.

Figure 3:
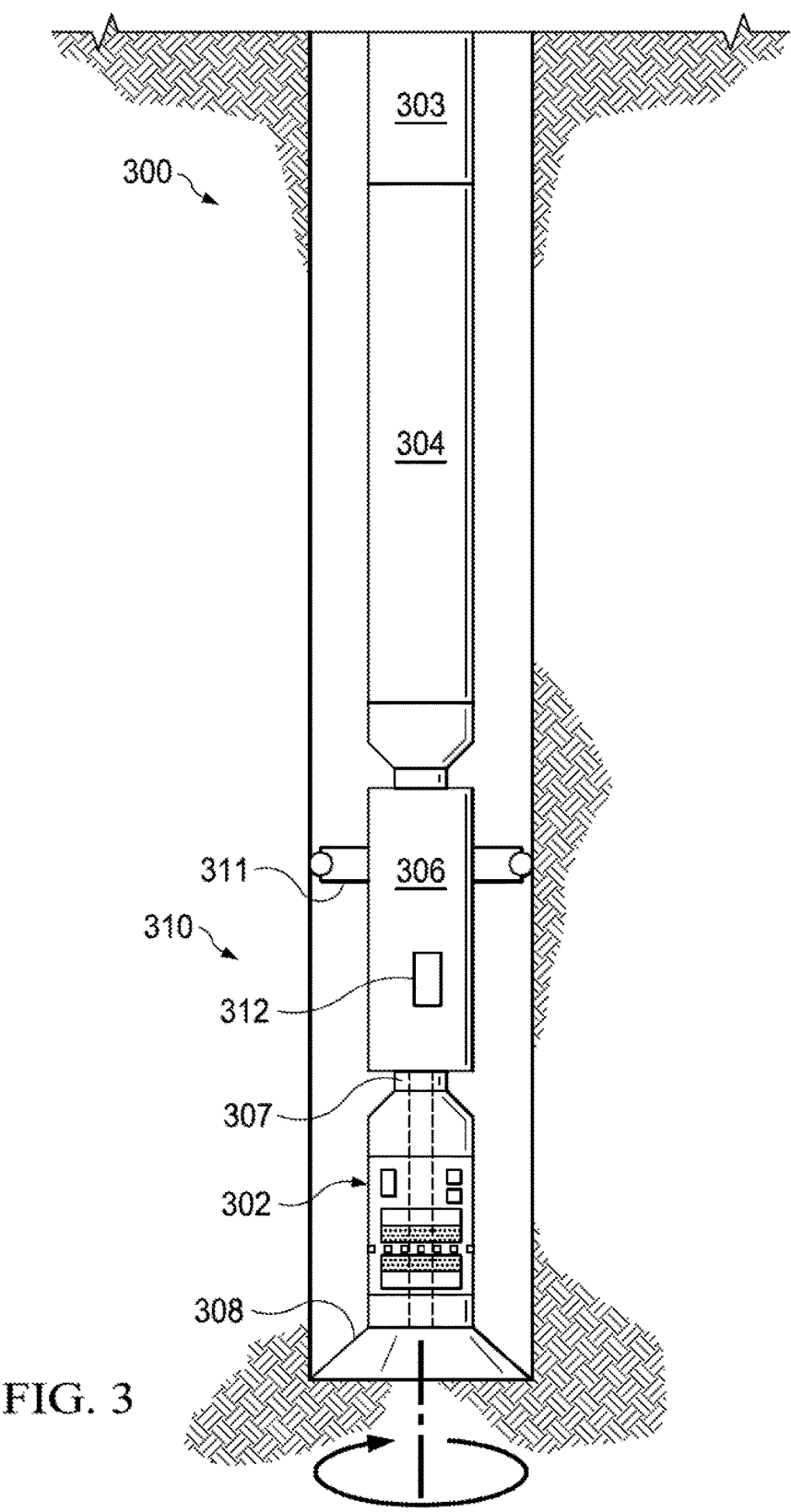
FIG. 3 is a schematic representation of a sensor system on a drill string with a rotary steering system in accordance with the disclosed embodiments.

Turning now to FIG. 3 showing a portion of a drill string 300 with a sensor system 302 in accordance with the disclosed embodiments. In one embodiment, the sensor system 302 may be integrated as part of a near-bit sub. In another embodiment, the drill string 300 may include a sensor system 303 positioned above an optional mud motor 304 connected to a rotary steerable tool 310 drive shaft 307, and a drill bit 308. In one embodiment, a rotary steerable tool 310 may use a tilt or point bit steering arrangement where the drill bit 308 is tilted in a desired direction for drilling while the housing 306 remains stationary within the formation through the use of gripping devices 311 (non-blocking) to prevent the housing 306 from rotating with the drill string 300. The drive shaft 307 may be elastically bent with a bow like profile with respect to the longitudinal axis of the housing 306 between one or more fulcrum points to permit the drill bit 308 to tilt while the mud motor 304 or the drill string 300 or both rotate the drive shaft 307.

In another embodiment, a sensor system 312 may be integrated with the rotary steerable tool 310. For example, the sensor system 312 may be located in the nonrotating housing 306 of the rotary steerable tool 310. Since the sensor system 312 is stationary in the non-rotating housing 306, the rotation of the drill bit 308 may cause cyclical fluctuations in the magnetic field as the drill bit 308 rotates. Regardless of the location of the sensor system 302 (alternatively sensor systems 303, 312), the sensor system 302 may monitor the rotation of the drill bit 308 and compensate for the cyclical fluctuations of the magnetic field that result from the motion of the drill bit 308. In one embodiment, the sensor system 302 may determine the revolutions per minute of the drive shaft 307 connected to the drill bit 308 to subtract the fluctuation effects of the rotation on the magnetic field. The compensation for rotation may be performed downhole to tune the sensor system 302 by subtracting those effects from the measurements of the sensor system 302 or by electronically filtering out the signals received by magnetometers associated with a number of blades and rotation speed of fixed cutter drill bit 308 that cause variance in reluctance and other affects to the magnetic field. Compensation may also be performed or apply to any variance in the magnetic field sensed by the sensor due to a difference in rotation speeds between the sensor and other elements in the drill string.

This may also apply to embodiments that include roller cone drill bits where a variance may occur as the roller cone drill bit is rotated.

In one embodiment, compensation may include digitizing the received signal, running a fast Fourier transform (FFT) on the sampled data, identifying the energy at frequencies related to the rotation speed of the shaft, subtracting that part of the signal from the FFT spectrum, and then re-inverting the frequency domain FFT back into a time domain of signal strength verse time or azimuthal position leaving the signal associated with the magnetization detection of the nearby man made structure in the processed signal. Many other digital filtering techniques are applicable and know to those skilled in the art.

Figure 4:
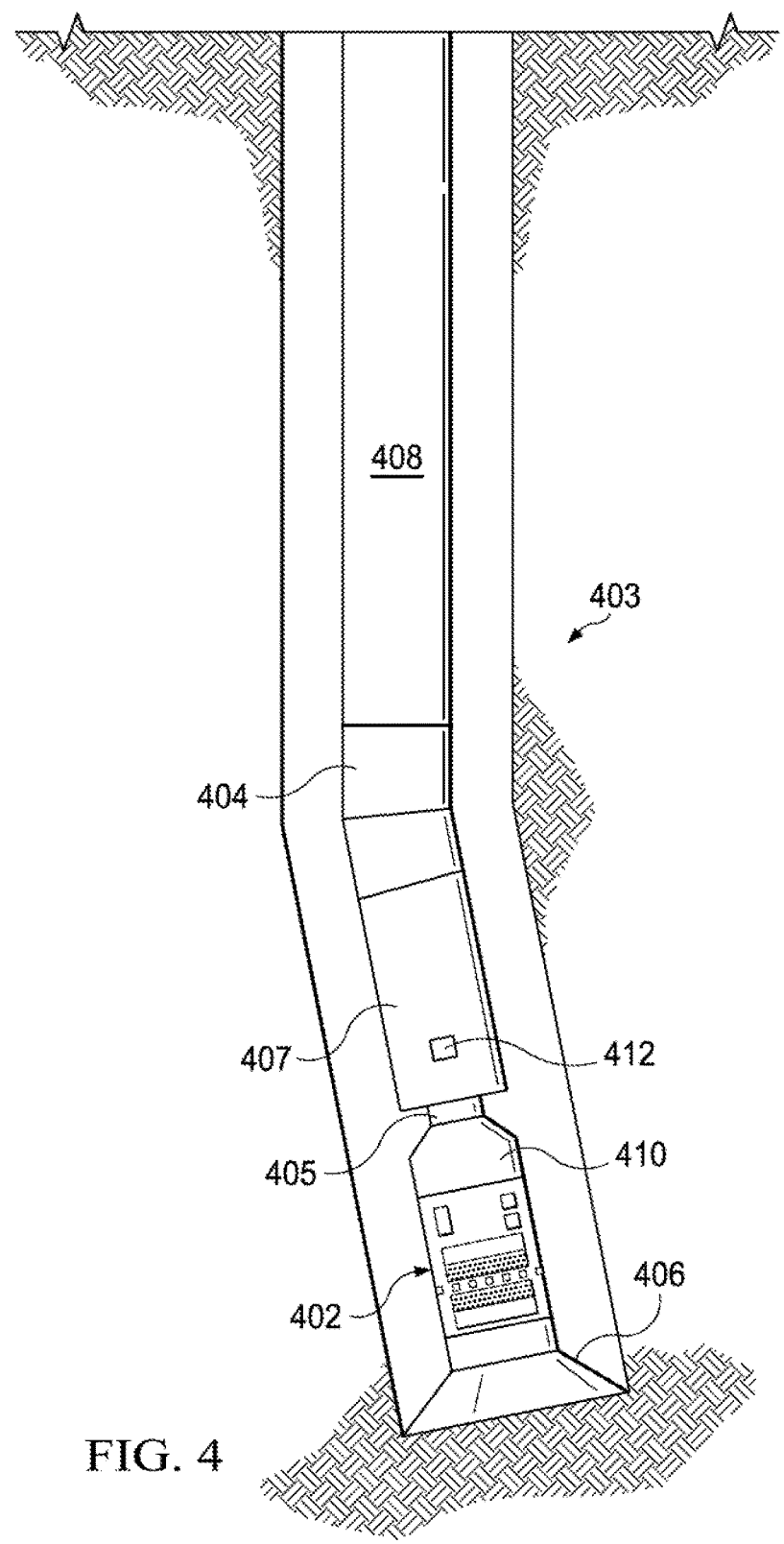
FIG. 4 is a schematic representation of a second sensor system on a drill string with a rotary steering system in accordance with the disclosed embodiments.

FIG. 4 shows a sensor system 402 on a motor based drilling system 403 in accordance with the disclosed embodiments. In certain embodiments, the motor based drilling system 403 may include a Moineau style positive displacement motor (PDM), turbine motor (e.g. a turbo drill), vane motor, or electric motor that is connected to a drive shaft 405 having a drill bit 406. The motor based drilling system 403 may also incorporate a mud motor 408 for increasing the speed of rotation or torque applied to the drill bit 406 and a bent sub 404 that is part of the mud motor 408 torsional power section for the purpose of steering the drilling direction of the bore hole. The bearing housing 407 connects to a bearing assembly which is also part of the mud motor 408, which provides for supporting the drive shaft 405 during on and off bottom loading and supports the drive shaft 405 radially with radial support bearings to keep the drive shaft 405 centered in the bearing assembly. Hence, the bent sub 404 tilts the drill bit 406 in a desired direction or a toolface direction. When the drill string (not shown or labeled) is slid the toolface direction is not rotating and thus the bit 406 is tilted in a generally fixed direction which aids the drilling of the borehole in the desired direction of the tilted angle. When it is desired to drill in a different direction, the toolface is oriented from surface to point in a new direction and weight or force is applied to the drill bit 406 to cause drilling to steer in the new direction of the toolface. When it is desired to drill straight ahead the drill string may be rotated, which rotates the bearing housing 407 with the mud motor resulting in no specific toolface direction being held stationary while the drill bit 406 rotates. As shown in FIG. 4, the drill bit 406 averages out a direction of drilling a new bore hole that is typically straight ahead. In one embodiment, the sensor system 402 may be coupled to the driveshaft 405 that may serve as a source for a magnetic North reference. The sensor system 402 may be located adjacent to or inside the drill bit 406 or may be located further up in the motor based drilling system 403 or drill string so as to not interfere with the ferromagnetic and magnetic material of the lower assemblies. In one embodiment, the bottom hole components may be made of non-magnetic material so that the sensor system 402 is as close to the bottom of the drill string as possible to aid in steering. The use of non-magnetic materials may prevent a magnetic circuit path on the drill string from having a shunting effect of the magnetic flux on the magnetic source thus reducing the amount of magnetic flux that may be used for sensing. In another embodiment, a north seeking gyroscope may be positioned in a near bit sub to provide a northward or relational reference to a fixed direction either during rotation or when the drill string is stopped. Magnetometers tuned to measure the Earth's magnetic field may also be used to determine a magnetic north direction in cooperation with accelerometers to resolve the horizontal plane portion of the earth's magnetic field. Direction or orientation determined by a sensor system 410 or interconnected devices, sensors, or tools, may be utilized to determine a relative direction to a target, such as a target well, based on reluctance sensor readings of the sensor system 410. In another embodiment, the sensor system 410 may include accelerometers for determining position, orientation, gravitational, and other information associated with the drill string. For example, accelerometers may be utilized to determine a high side and low side reference of the bore hole for the sensor system 410 when operating at an inclined angle from the down direction. Orientation data may be transmitted to surface over a telemetry system, such as a mud pulse telemetry system, wired drill pipe, acoustic telemetry, or electromagnetic telemetry system, to allow the operator to maintain the orientation in a desired direction. Orientation data may also be transmitted to a down hole automated toolface controller to aid the automated controller in maintaining the toolface at a target value or direction. For example, two orthogonal, accelerometers (e.g., x axis and y axis oriented) may be integrated with the sensor system 410 to determine orientation and relative positioning including a high side in an inclined position.

In another embodiment, a sensor 412 may also be integrated into the bearing housing 407, bent sub 404, or body of the mud motor 408 rather than into a near bit sub or drill bit. For example, the sensor 412 may be configured to not rotate during sliding for steering purposes as is the sensor 412 may also be mechanically coupled either directly or indirectly to the bearing housing 407 and may reside above or below the bearing housing 407 without being mechanically coupled to the drive shaft 405 which rotates based on hydraulic power from drilling fluid flow in the drill string while the drill string remains stationary. In one embodiment, it is desirable for the sensor 412 to be as close to the drill bit 406 as possible for accurate determinations of proximity to a target object relative to the drill bit 406.

Figure 5:
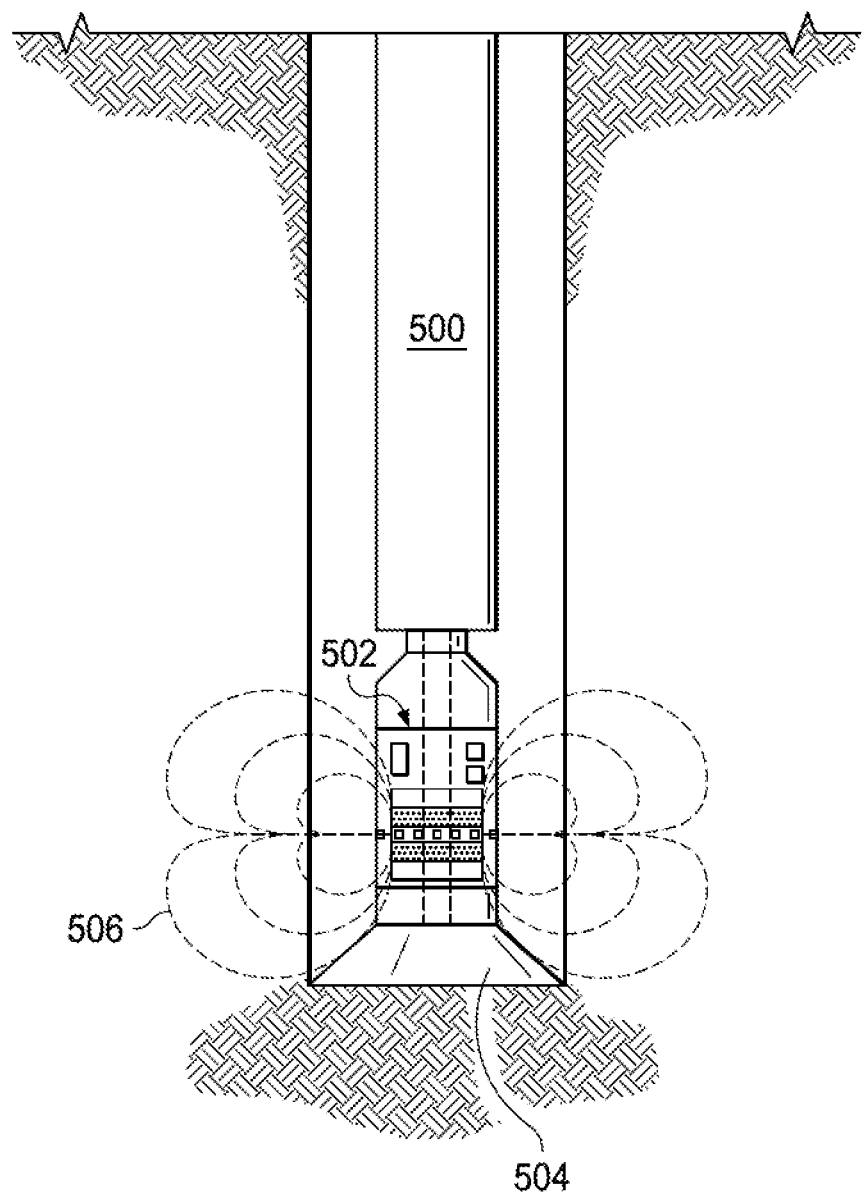
FIG. 5 is a pictorial representation of a magnetic field cross section in the absence of a magnetizable object near a drilling tool in accordance with the disclosed embodiments.

FIG. 5 is a pictorial representation of a magnetic field cross section in the absence of a magnetizable object near a drilling tool 500 in accordance with the disclosed embodiments. As shown in FIG. 5, the sensor system 502 is positioned adjacent a drill bit 504. In one embodiment, the sensor system 502 may include one or more permanent magnets to create a bucking effect forcing the shape of a magnetic field 506 coming away from the like poles, in this case the North poles to push magnetic flux radially outward thus focusing part of the magnetic field in a more radial direction away from the axis of the drilling tool 500 at this location. As shown in FIG. 5, the magnetic field 506 does not interact with any magnetizable objects.

The magnetic field 506 as shown is represented by isotropic lines of the field strength given off by multiple bucking magnets (e.g., two magnets). The magnetic field 506 may vary in appearance based on real circumstances, geometries, magnetic properties of a target casing, materials utilized to make the drill bit, formations near the sensor system 502 and components in the drilling tool 500 (including steering assemblies and near bit sub).

Figure 6A:
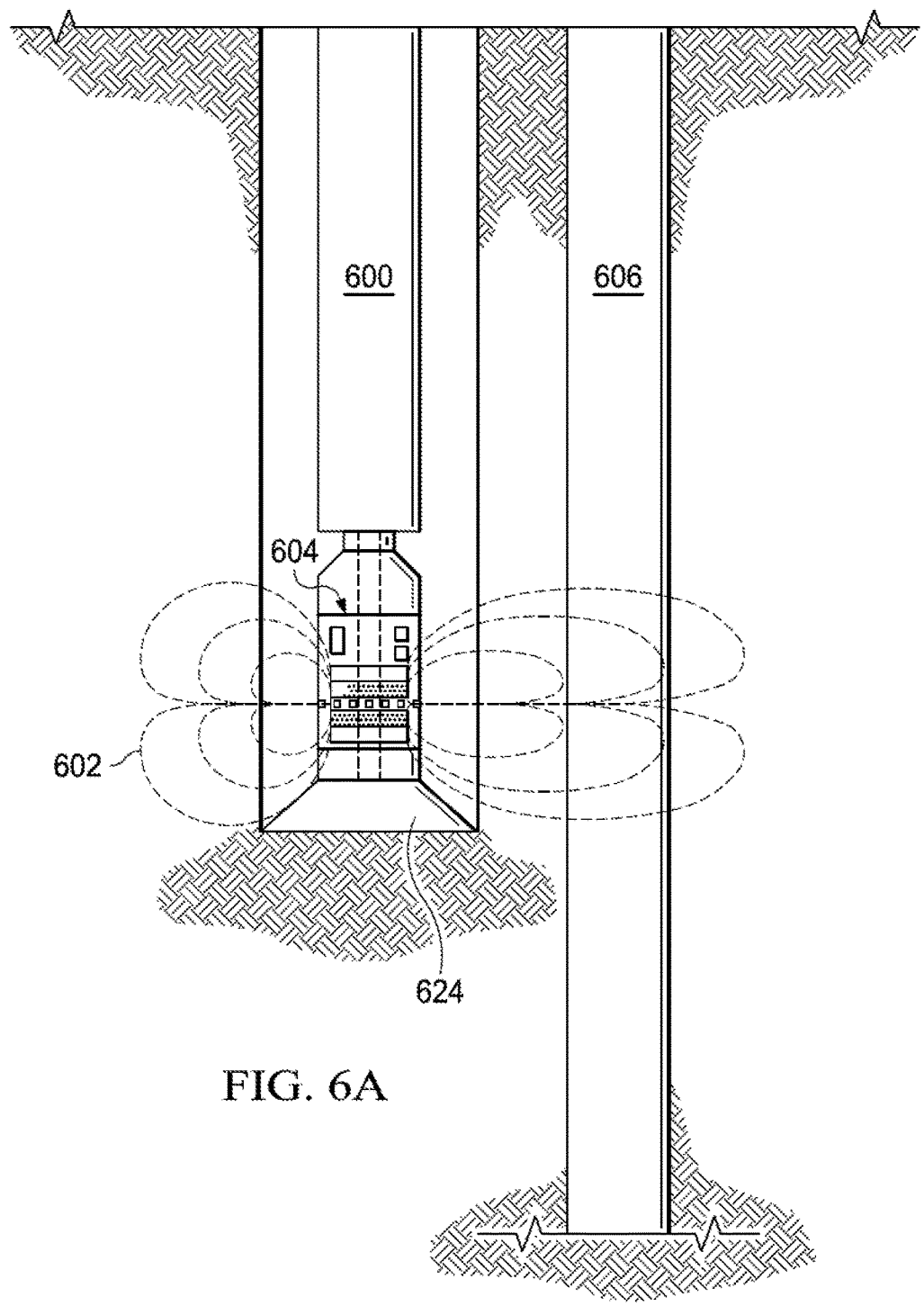
FIG. 6A is a schematic, pictorial representation of a magnetic field cross section of a drilling tool in the presence of a magnetizable object in accordance with the disclosed embodiments.
Figure 6B:
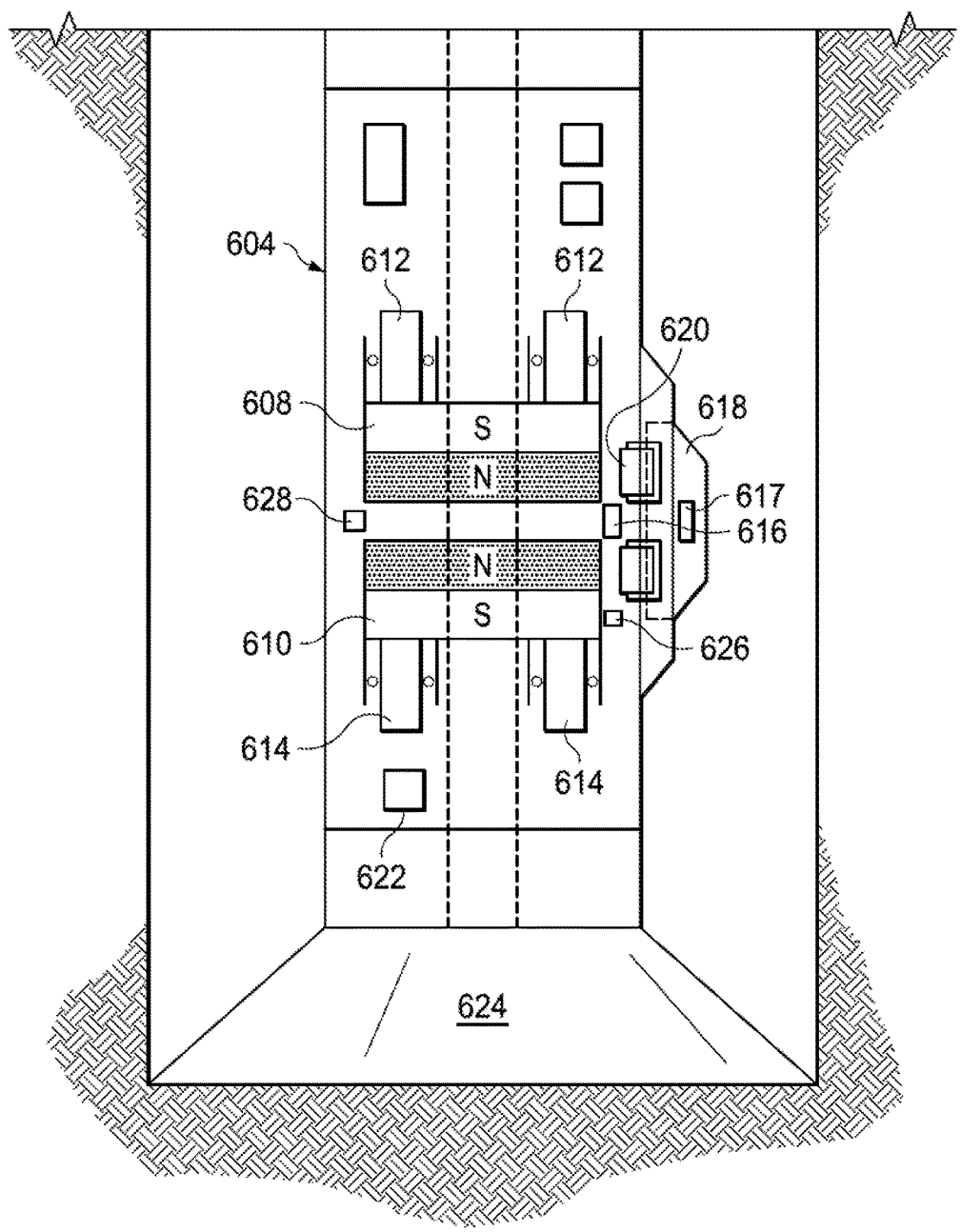
FIG. 6B is a schematic, pictorial representation of a sensor system in accordance with the disclosed embodiments.
Figure 6C:
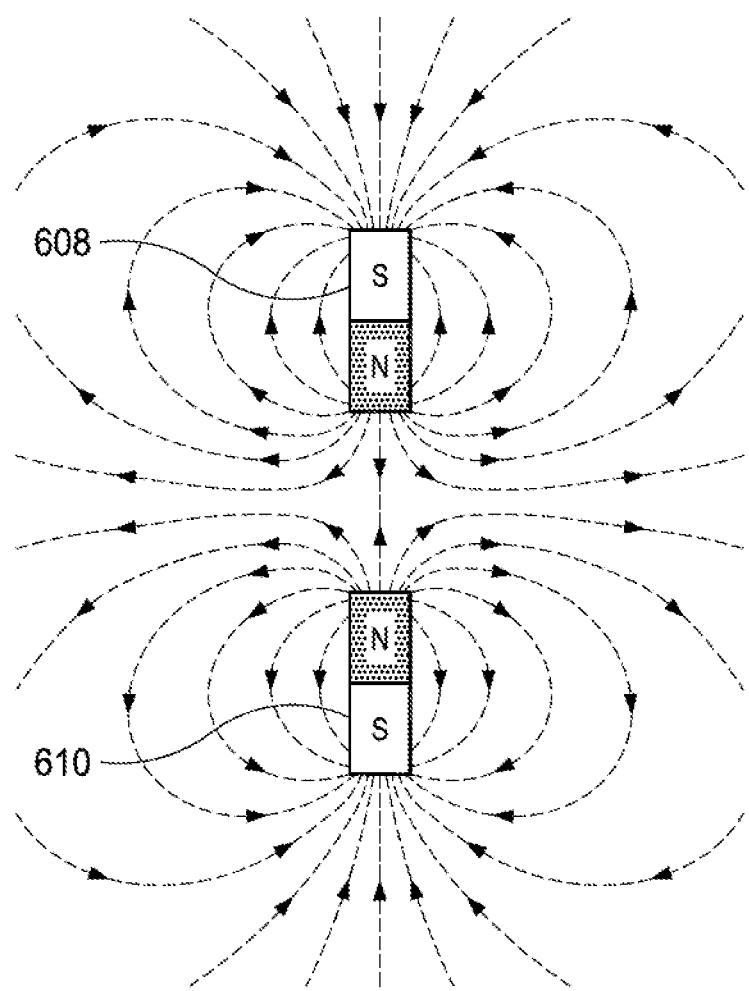
FIG. 6C is a pictorial representation of a bucking field generated by magnets in accordance with the disclosed embodiments.

Turning now to FIGS. 6A-C, FIG. 6A is a pictorial representation of a magnetic field cross section of a drilling tool 600 in the presence of a magnetizable target object 606 in accordance with the disclosed embodiments. One of the improvements of the illustrative embodiments over previous permanent magnet sensors is that a magnetic field 602 around the longitudinal axis of the drilling tool 600 may be uniform in shape as compared to transaxis magnets used in different rotating magnet ranging methods. As a result, a sensor system 604 of the drilling tool 600 offers more sensitivity to near field magnetizing effects that may perturb the magnetic flux density in the magnetic circuit of the sensor system 604.

Turning now to FIG. 6B, showing the sensor system 604 of FIG. 6A. In one embodiment, to create a bucking effect two permanent magnets 608 and 610 (e.g., ring magnets) or two electromagnets that generate a magnetic field when electric current is flowing through windings (not shown) are utilized. The magnets 608 and 610 are placed close to each but not necessary against each other, such that the dipole moments of each magnet 608 and 610 are approximately aligned and opposing each other on the longitudinal axis of the sensor system 604. For example, a first magnet 608 may have opposing North pole of one magnet against the North pole of the second magnet 610, such that the poles face each other. Likewise both the South poles of each magnet 608 and 610 may be aligned to face each other in this arrangement. This is often referred to as a bucking magnet effect. In this manner, the magnetic lines of flux coming from each side create an opposing repulsion force against each other trying to push the magnets 608 and 610 apart rather than attract themselves toward each other (which would be the case if the arrangement was a North pole facing a South pole magnet).

In one embodiment, the sensor system 604 may include a position sensor 628 configured to determine the position of the magnets 608 and 610. The position sensor 628 may also indicate the distance between the magnets 608 and 610 for determining the bucking effect and magnetic field parameters and characteristics.

The sensor system 604 may further include at least one actuator 612 and 614. Although shown as multiple actuators 612 and 614, the actuators 612 and 614 may be replaced by a single actuator. The first actuator 612 may move the first magnet 608 along the longitudinal axis of the sensor system 604 and the second actuator 614 may similarly move the second magnet 610. In other embodiments, the actuators 612 and 614 may also move the magnets 608 and 610 horizontally, rotationally, or in any three dimensional direction. The motion of the magnets 608 and 610 toward or away from each other adjusts the bucking effect utilized by the sensor system. In another embodiment, the actuators 612 and 614 may determine or indicate the relative positions of the magnets 608 and 610 for determining the parameters and effects of the magnetic field.

In one embodiment, where the sensor system 604 and associated drill bit 624 are being utilized to mill into a casing or attempting to closely follow an external magnetizable object, the separation distance between the two bucking ring magnets 608 and 610 may be adjusted to maximize the flux density at the radius of the drill bit 624 at the same time maximizing the flux density passing through a magnetometer 616 (or gradiometers). In one embodiment, the sensor system 604 is calibrated before downhole use utilizing a calibration process or the magnets 608 and 610 may be set to pre-determined positions at the rig site based on requirements for the next bit run. The separation distance of the magnets 608 and 610 may be managed downhole in real time to adjust the focus of the radial field. For example, the position sensor 628 may be utilized to determine adjustments for adjusting the field. In one embodiment, at least one ring magnet (e.g. magnet 608) is attached to an actuator 612 (e.g., a sliding piston) that is actuated to move the ring magnet 608 closer or further away from the other ring magnet 610. In one embodiment, ring magnets 608 and 610 may be cylindrical with a hollow or filled core.

It may be preferable to move both magnets 608 and 610 equi-distant apart along the longitudinal access of the tool while maintaining the magnetometers 616 and 617 at the center point of the two ring magnets 608 and 610 with a selected radial offset.

Adjustments to the position or location of the magnets 608 and 610 may be made to adjust the peak radial flux point or flux density either further away for closer to the longitudinal axis of the magnets 608 and 610.

In one embodiment, the magnetometer 617 may also be positioned or integrated with one or more extendable pads 618. In one embodiment, the extendable pads 618 are positioned at the same longitudinal position on the sensor system 604, but at different circumferential positions on the sensor system 605, such that the extendable pads 618 are in alignment with the bucking field of the magnets 608 and 610. The extendable pads 618 may extend or retract radially from the sensor system 604 to aid in optimizing the position of the magnetometer 617. In one embodiment, a pad position actuator 620 may move the extendable pads 618 away from the longitudinal axis of the sensor system 604. For example, the extendable pads 618 may maximize the magnetic flux that passes through or intersects the magnetometer 617 at a focal radius. By being able to extend the magnetometer 617 closer to a magnetizable structure, the sensitivity of the sensor system 604 to the magnetizable field created in the magnetizable structure by the bucking magnetic field may be increased. The magnetometer 617 is moved in a radial direction on the extendable pads 618 along the sensing axis of the magnetometers.

In one embodiment, the location of the magnetometer 617 may be determined from the pad position actuator 620. In another embodiment, the location of the magnetometer 617 may be determined by a position sensor 626. For example, the position sensor 626 may determine the position of the magnetometer 617 on the extendable pads 618. The position of the magnetometer 617 may be determined relative to the fixed magnetometer 616.

In one embodiment, it may further be advantageous to position one stationary magnetometer 616 on the body of the tool co-aligned with the magnetometer 617 thus allowing an adjustable radial difference between the two magnetometers 616 and 617 which may be used to change the sensitivity to the magnetic gradient field in a radial direction from the sensor system 604. A radial distance sensor, such as the position sensor 626, may be used to monitor and calculate the radial difference between the two magnetometers 616 and 617 to the gradient field with respect to distance between the two magnetometers 616 and 617 and the distance to the magnetizable structure the gradiometer senses in the magnetic circuit. Likewise, intensity measurements may be made by using either magnetometer 616 and 617.

In one embodiment, magnetometer 617 may consist of two radially spaced magnetometers in the extendable pads 618 which may also provide a movable gradient field measurement using the two magnetometers. Other means of using one magnetometer at different radial positions of the extendable pads 618 may also be used to measure the gradient field.

In one embodiment, a magnetic field master controller 622 (or processor) may control the position of the magnets 608 and 610 and any sensors, such as the magnetometer 617. The controller 622 may be communicably coupled to one or more position sensors 628 and receive input signals from the position sensor on the position of the magnets 608 and 610. In response to input signals from the one or more position sensors 628, the magnetic field master controller 622 may output control signals to the multiple actuators 612 and 614, based on one or more control algorithms executed by the controller, to move the magnets along longitudinal axis of the sensor system, horizontally, rotationally, or in any three dimensional direction to adjust the bucking effect utilized by the sensor system. The one or more control algorithms of the magnetic field master controller control movement of the magnets 608 and 610 and the magnetometers 617 (or gradiometer) based on predetermined positions, sensed position, sensed conditions, automatically implemented algorithms, or in response to commands received from the surface using down link telemetry, such as electromagnetic communications, acoustic telemetry, drill string variable torsional telemetry, drill string RPM telemetry, wired pipe, or mud pulse telemetry. As a result, the position of the magnets 608 and 610, magnetometer 617, or other sensors may be optimized based upon the conditions, performance of the sensor system 604, or radial distance to a magnetizable structure. In one embodiment, one or more of the control algorithms are located in the magnetic field master controller. In another embodiments, one or more of the control algorithms are located in one or more processors located at the surface, such as a computer, tablet, wireless device, portable computer or mobile computing system in communication with the magnetic field master controller.

During an intersection process, the radial position of the magnetometer 617 and the axial position of the magnets 608 and 610 may be adjusted to maximize the reluctance response as distances from the magnetizable structure change thus self-tuning the sensor system 604 for a maximum sensitivity. Such adjustments may also be managed by a feedback control system where the extendable pad 618 and magnets 608 and 610 distances and positions are adjusted dynamically to sense for a maximum signal response to the magnetizable structure. In one embodiment, the sensor system 604 may be dynamically adjusted or variably tuned utilizing the positioning of the magnets, sensors, and other components or the magnetic field intensity.

FIG. 6C illustrates the bucking effect of the magnets 608 and 610 in accordance with the disclosed embodiments. As is well known, opposite poles attract each other and the flux lines of magnets aligned by opposite poles extend between the poles without much variation (not shown). However, as shown in FIG. 6C, the positioning of two identical poles of the two magnets 608 and 610 forces the magnetic fields to extend radially away from the magnets creating the bucking effect herein described.

Turning again to FIG. 6A, the magnets 608 and 610 within the sensor system 604 may impose a polarizing magnetizing force on a ferrous material or paramagnetic material in a target object 606. As the drill bit 624 rotates, the skewing of the magnetic field 602 may remain transfixed in the direction of the ferrous material of the target object 606 that has been magnetized. As a result, one side of the sensor system 604 may have a different net magnetic field 602 than under conditions where no ferrous or paramagnetic material is present (e.g., FIG. 5).

If the polarizing magnetic field from the ring magnets 608 and 610 is strong enough, the ferrous material of the target object 606 may respond with an additive magnetic field to the polarization field being applied to the ferrous material. Because the ferrous material of the target object 606 may already possess a remnant magnetic polarization, the remnant magnetic field may oppose or add to the polarization field from the ring magnets 608 and 610. As the polarization field strength increases in the ferromagnetic material, the magnetic domains in the target object 606 begin to align with the polarization field, adding to the overall magnetic field strength in the magnetic circuit utilized by the sensor system 604. The effects of a magnetizing response field may also be detected by imparting a time changing polarizing magnetic field at a desired frequency, such as 10 Hz, to detect the ferrous material more clearly through a magnetic induction effect. This may be achieved by using electrical coil windings as the bucking magnetic field source or as a supplement to the magnetic field from permanent magnets thus creating both a static and dynamic magnetic polarization field to be applied to the surroundings of the sensor system 604.

If the remnant magnetism in the ferrous material is in an opposing dipole alignment, such as a North polarizing field facing a North remnant field, the net magnetic field strength or the magnetic gradient sensed by the magnetometer 616 or gradiometer may actually be less than what is detected on the non-ferrous side. As a result, the variance in the static magnetic field strength may be used as a location guide as to where the ferrous structure is regardless of whether the magnetization field of the ferrous material is currently additive or subtractive of the net magnetic field or magnetic field gradient sensed at the magnetometer. In one embodiment, the magnets 608 and 610 may provide enough polarizing magnetic field to urge the ferrous material of the target object 606 into as much magnetic alignment to create an additive magnetizing field to the polarizing field being applied. The magnets 608 and 610 may provide a sufficient polarizing field to drive the nearby ferrous material into or near magnetic saturation, such that the vast majority of the magnetization field strength is available for sensing by the reluctance sensor. The data determined by sensing the differences in magnetic flux are utilized to determine a distance or direction to the target object 606.

Figure 6D:
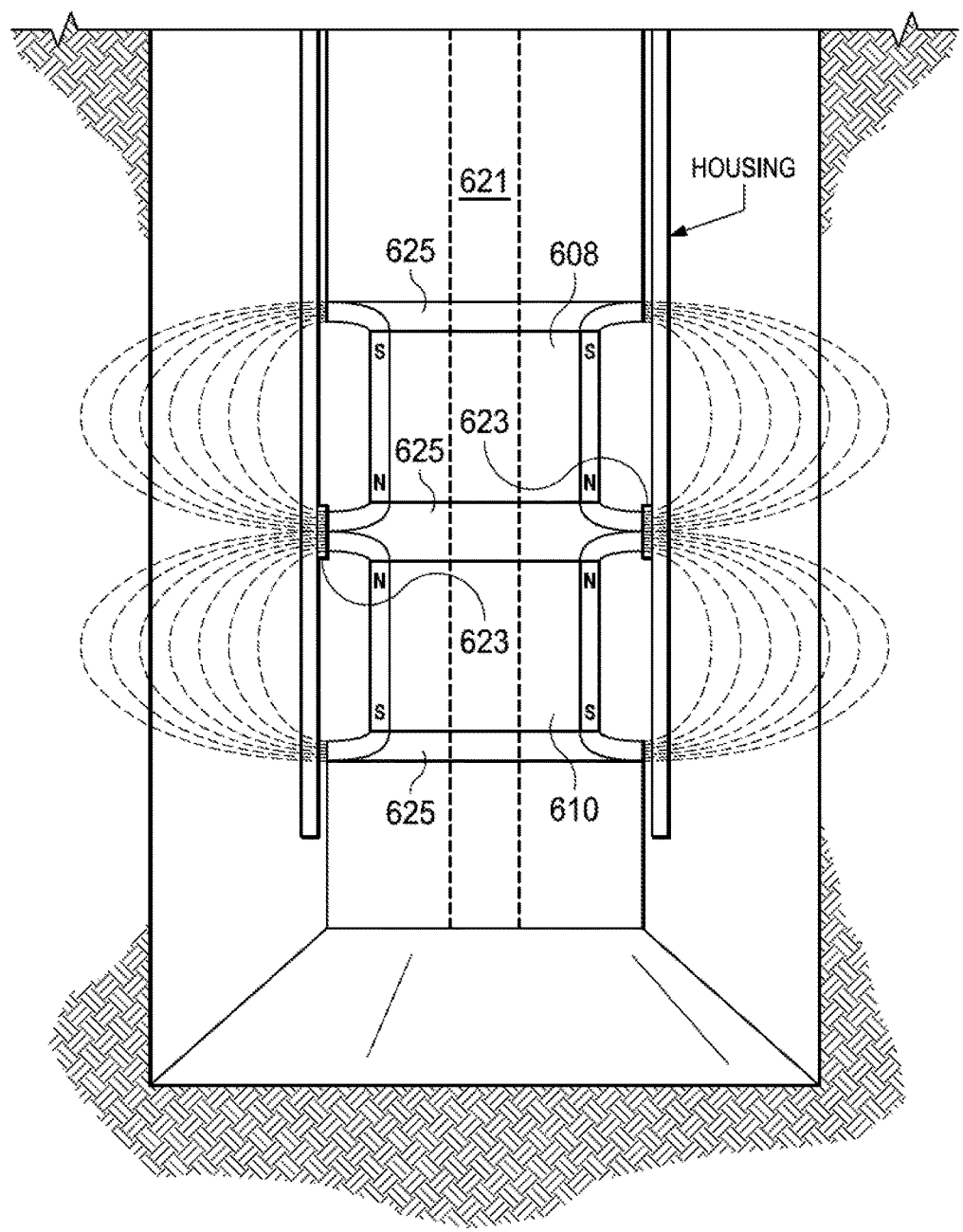
FIG. 6D is a schematic, pictorial representation of a bucking field generated by a sensor system in accordance with the disclosed embodiments.

Turning now to FIG. 6D, in another embodiment, magnetically permeable guides 625 within a house 621 may alter the magnetic flux path generated by the magnets 608 and 610 by guiding the flow along a more desirable radial path. In one embodiment, the magnetically permeable guides are formed from a highly permeable material that has low resistivity to magnetic flux, such as soft iron, ferrite, or permalloy. The magnetically permeable guides 625 may guide the flux through a path as shown and the sensors 623 may be positioned in the path. The magnetically permeable guides 625 may be attached to the ends of the magnets 608 and 610 or in close proximity to the ends of magnets 608 and 610. The magnetically permeable guides 625 may reduce the air gap and better shape the magnetic field utilized.

As previously described, the sensors 623 may represent magnetometers, gradiometers, or other magnetic field sensors. The magnetically permeable guides 625 may alter the magnetic flux path by guiding the flux along a more desirable radial path and positioning the sensors 623 in that path. For example, a gradiometer may be positioned at a center point of the outer radius of the magnetically permeable guide. The sensors 623 may also be positioned on moveable of fixed pads as is described herein. In other embodiments, magnets may be polarized or bent into the desired shape to maximize radial field strength.

Figure 7A:
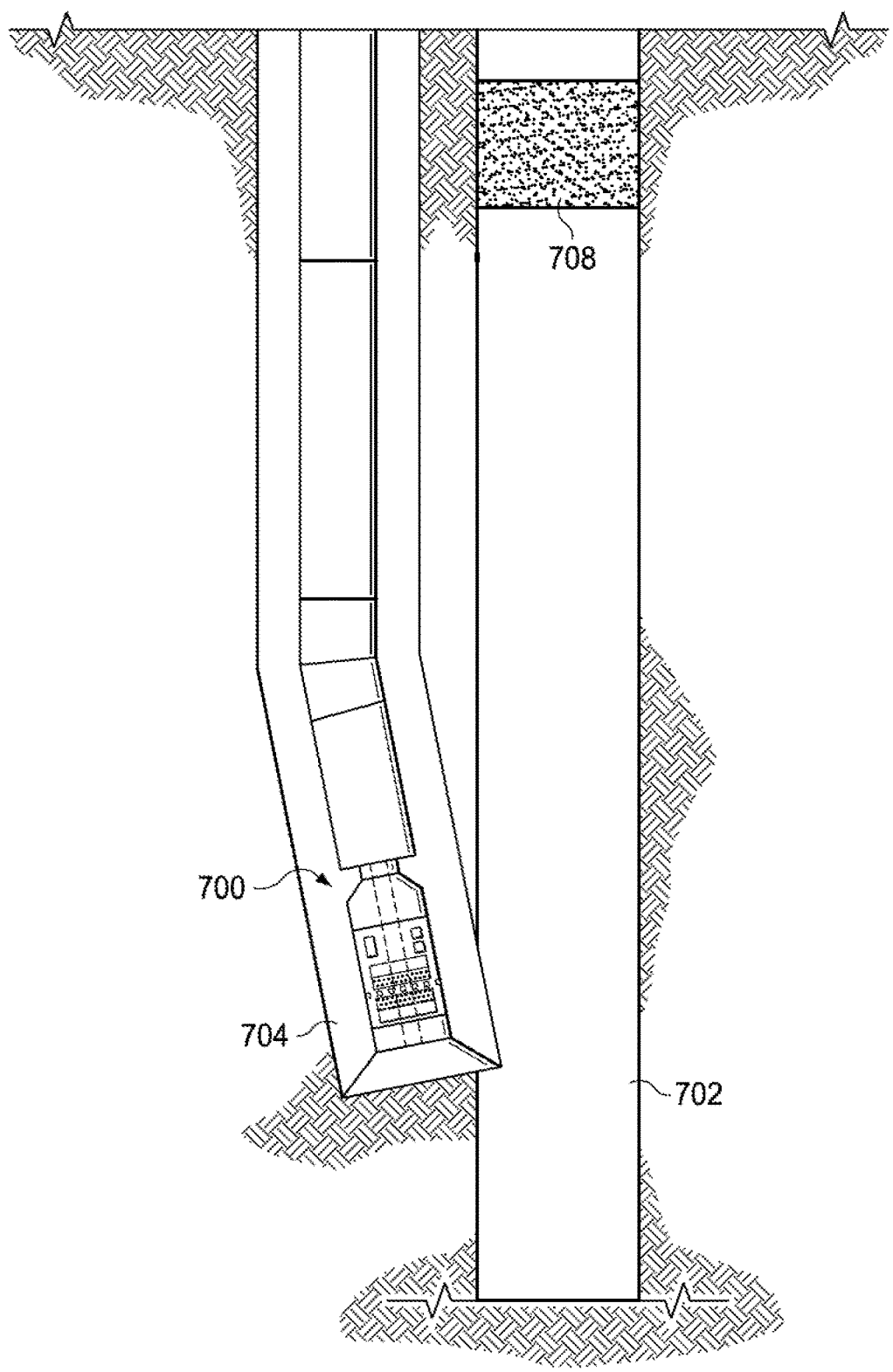
FIG. 7A is a schematic, pictorial representation of a steerable drilling tool being utilized to intersect an existing well in accordance with the disclosed embodiments.
Figure 7B:
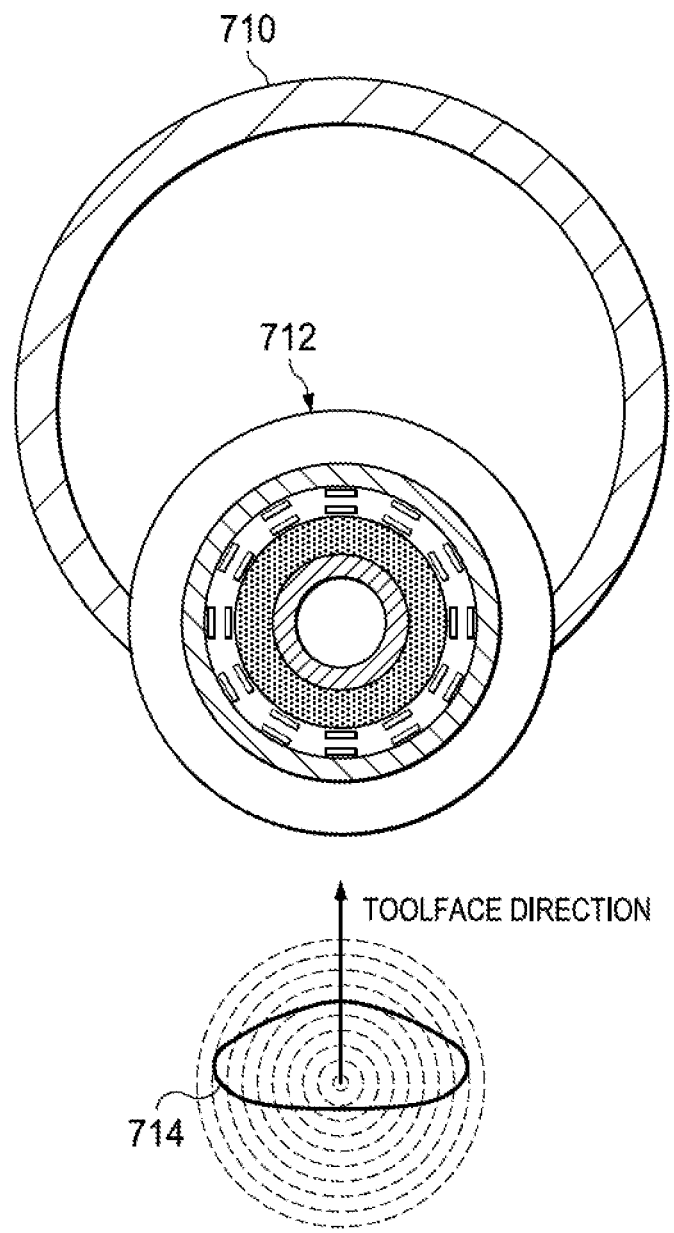
FIG. 7B-C are schematic, cross sectional views of alignment of a well intersection in accordance with the disclosed embodiments.
Figure 7C:
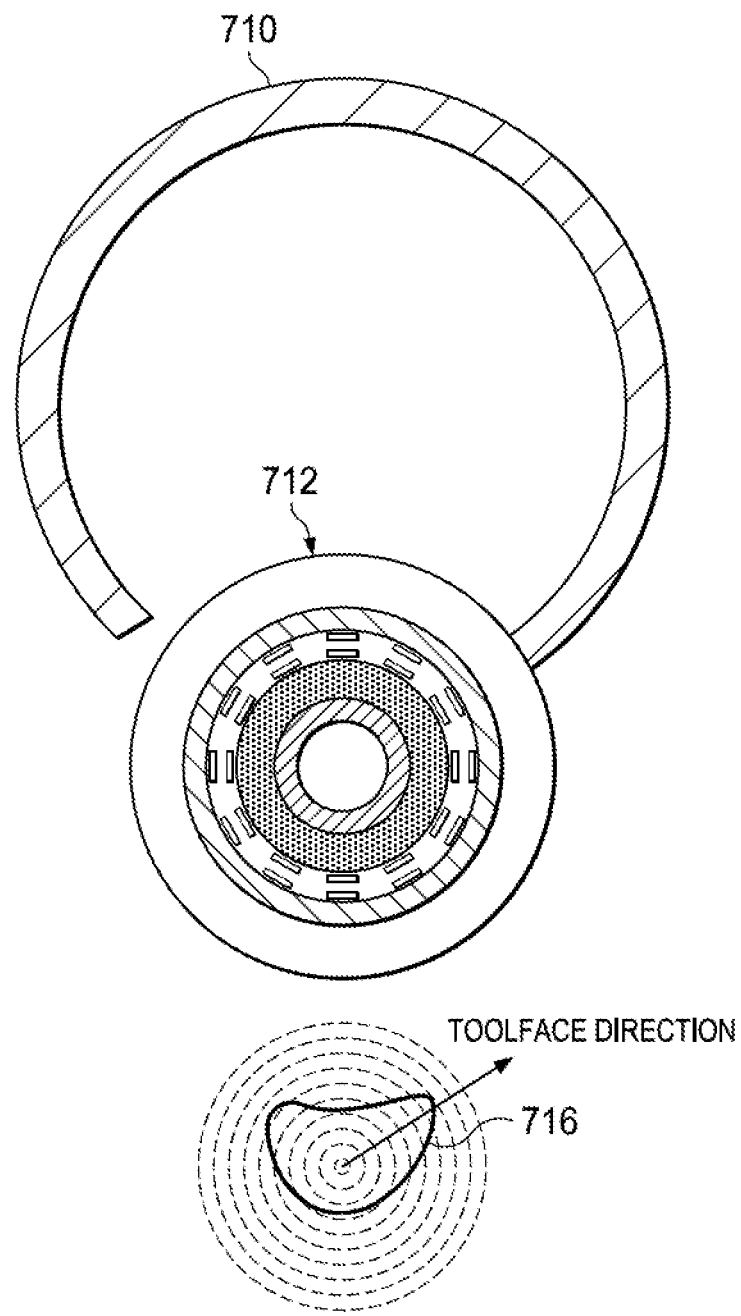

Turning now to FIGS. 7A-C showing a schematic, pictorial representation of a steerable drilling tool 700 being utilized to intersect a well 702, which may be an existing or target well, in accordance with the disclosed embodiments. On occasion it becomes necessary to drill an intersecting well 704 utilizing the drilling tool 700 to correct for a problem or obstruction 708 within the existing well. For example, the intersecting well 704 may be a relief well drilled to deal with a blowout on an upper end of the well 702. In some instances only fluid communication between the two wells is required. However, the situation may arise where it is desired to re-enter the lower portion of an existing well so completion or work over equipment may be accessed or deployed into the lower existing well portion. Such equipment may include, but is not limited to, sand screens, bridge plugs, liners or casing, packers, multi-lateral junctions or any other permanent or temporary equipment, such as data pressure recorders, flow meters, hydraulic fracturing equipment, sand vacuums, bailers, fishing equipment, stimulation equipment, cementing equipment, or work over tools. The intersection may also permit the permanent plugging of the hole section by permitting cementing equipment or cement into the intersected well.

In many cases, it may be difficult to intersect the well 702. For example, it may be difficult to intersect a magnetizable metal tubular 710, such as the casing or liner of a well dead center. An operator may utilize a specialized mill 712 to drill into the tubular 710 of the well 702 as shown in FIGS. 7B and 7C. For example, a milling bit or mill 712 may be utilized for performing intersections of the metal tubular 710. The mill 712 may be designed to cut steel or other hardened materials. In one embodiment, the azimuthal profiles of a cut aperture into the well 702 may be monitored as the profile of the reluctance measurements change to indicate whether the mill 712 is centered when drilling into the tubular 710 of the target well. For example, the azimuthal profiles (also referred to as reluctance profiles) may represent the magnitude of the magnetic field sensed along the circumference of the tool.

In one embodiment, polar responses 714 and 716 (e.g., graphical representations of the reluctance profile for a given radial direction using cylindrical coordinates) of the magnetizing field strength measured by the reluctance sensor from the tubular 710 may be utilized to determine a direction and simulate an interface of the mill 712 and the tubular 710. For example, the azimuthal profile or reluctance profile may represent the data/measurements taken by the sensors and the polar responses 714 and 716, shown in one example as a graph in a Cartesian chart, may represent a display presented to a user for analysis. As a result, the steering may be modified to keep the tool face of the steering system in the middle of the tubular 710 to perform a proper and effective intersection. Although such an operation is not typically done for blowouts, it may be utilized to reenter the tubular 710 when there is an obstruction 708 or a sheared or collapsed section of the well 702 above the intersection point. The steerable drilling tool 700 may also be utilized to detect a lateral opening in a casing string or down hole component. As a result, a steering member, may be deflected, turned, or oriented towards the opening to facilitate entry.

FIG. 7B shows the mill 712 correctly intersecting with the tubular 710 based on the physical interaction and the polar response 714. FIG. 7C shows the mill 712 skewed to one side indicating that the mill 712 and the tubular 710 are not properly aligned. The polar plot, response, or profile of the polar response 716 indicates that the tool face direction is not positioned directly toward the center of the tubular 710. By monitoring the polar responses 714 and 716 of the magnetizing field sensed by the reluctance sensor, the sensor system (or alternative a user) may more accurately align the tool face, such as the mill 712, during the milling operation to achieve reentry or at least intersection back into the tubular 710. For example, the mill 712 may be utilized to reenter an opening or component at a previously generated or occurring opening or location. The sensor system may then be able to avoid skipping the mill 712 off of the tubular 710 especially if the earth formations around the intersection point are soft.

The reluctance measurements may be binned azimuthally into arc segments of the azimuthal profiles of the polar responses 714 and 716 of the tool and may include a depth position or time of measurement of the sensor and mill 712, bit, or other intersection device, such as a laser cutter or high velocity fluid cutting jet, which may be utilized for steering for any number of milling or drilling operations and to monitor the progress of the milling into the target well, such as in a reverse multilateral or well intersection where the window is milled from the outside into the target well after the tubular 710 has been installed. Data sent from the sensor(s) to the steering controller or operator on the surface may monitor the sensor response verses direction by for example plotting the magnitude and direction of the sensed magnetic field strength or gradient that surrounds the sensor.

The steering controller is one or more downhole tools for steering the drill string. It may include the a bottom hole assembly and a sensor system with the corresponding drill bit. For example, the steering controller is a rotary steerable tool for downhole directional drilling and exploration. The steering controller may be configured to rotate, bend, actuate, or otherwise change directions, positions, and orientation. The steering controller may function automatically or based on operator instructions received from a surface computer or from other surface devices.

In one embodiment, data sent to surface may be limited to the magnitude and direction of peak values and direction of sensed field strength around the circumference of the tool sensor. Higher data densities may permit a magnitude profile to be tracked vs. depth or time on the polar profile of the polar response 716.

Figure 8A:
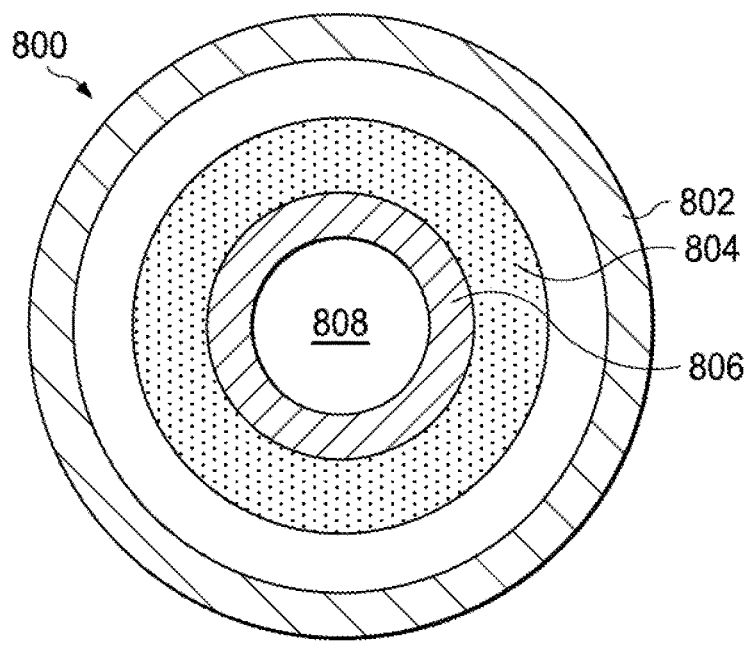
FIG. 8A-D are schematic, cross sectional views of a reluctance sensor system in accordance with the disclosed embodiments.
Figure 8B:
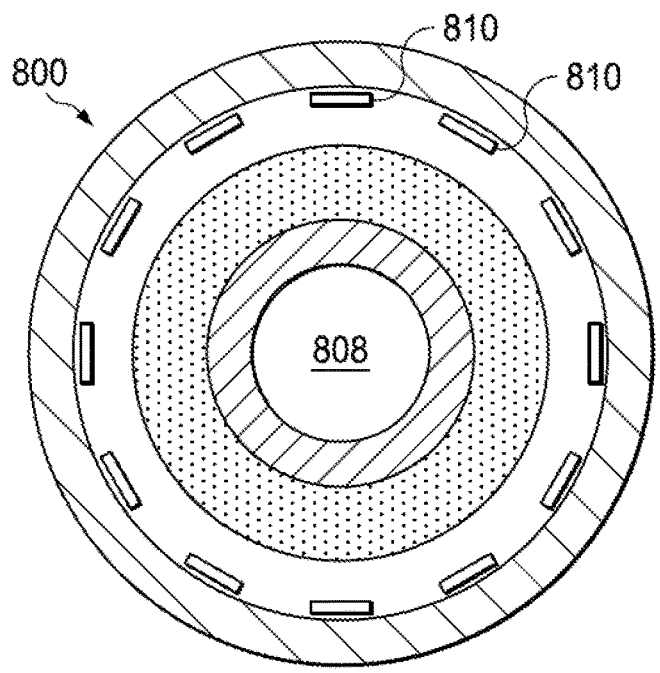
Figure 8C:
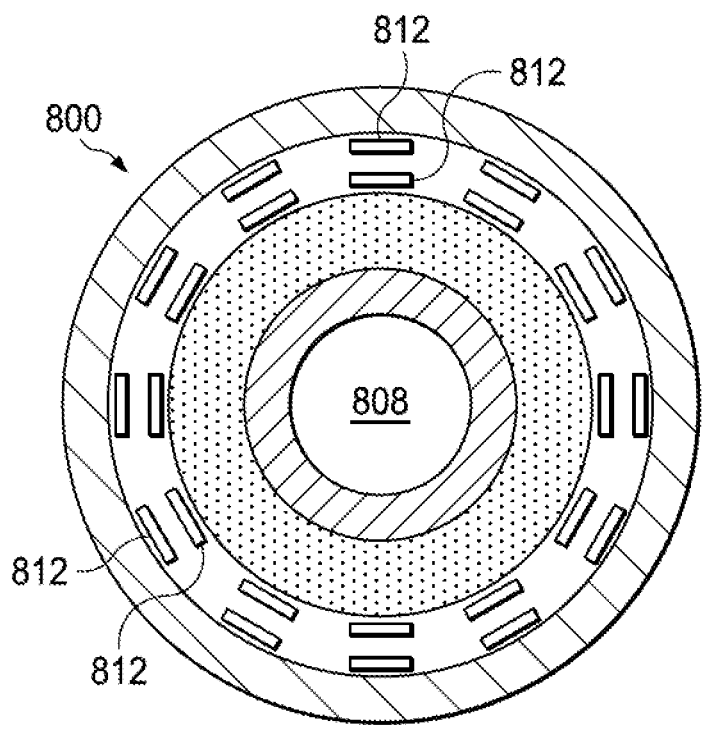

Turning now to FIGS. 8A-C showing a cross sectional view of a sensor system in accordance with the disclosed embodiments. In one embodiment, the sensor system 800 may include a housing 802, a ring magnet 804, a drive shaft 806, and a flow bore 808.

In one embodiment, the ring magnet 804 represents one or more permanent magnets. In another embodiment, the ring magnet 804 may represent one or more electromagnets or a combination of electromagnets and permanent magnets. Electromagnets may allow the magnetic field to be adjusted in real-time or apply a time varying magnetic field and may be more effective for high temperatures. The power used for the electromagnets may be adjusted to a desired level with a DC bias current to urge the magnetization of the ferrous target material into a desired magnetic polarization in line with the applied polarizing field of the electromagnets while still optionally including a time varying current.

Many possible types and orientations of permanent and electromagnets may be used to effect magnetization of the target material. For example, a focused field technique that has a radial focus along the longitudinal axis of the tool rather than along the cross axis of the tool as was shown earlier may be utilized. In this configuration the polarizing field affecting the ferrous target has an alternating magnetization response as the shaft is rotated. By placing the sensor in a radial position, in a radial sense direction, ideally between an S-S or an N-N pole the reluctance changes of the magnetic circuit may be sensed as the ferrous target material comes into as sensing range of the sensor during rotation.

For non-rotating sensors, such as when sliding with a mud motor where the sensor is on the mud motor body (and not the output shaft) or in a non-rotating housing of a rotary steerable tool, a number of sensors around the circumference of the tool may be used to distinguish the direction of the magnetizable object relative to the cross axis of the tool.

Other configurations are possible as well as other directional polarization of the magnetic source. The illustrative embodiments are configured where the objective is to force as much magnetic flux as possible into a radial direction away from the longitudinal axis of the tool. Using ring magnets to buck a magnetic field radially from the longitudinal axis offers the advantage that the longitudinal length of the magnetic may be increased easily by adding more height to the magnet structure and therefore results in a stronger radial polarizing magnetic field. Whereas, other geometries may run out of available space for larger magnets as the magnetic field strength increase becomes a function of the hole diameter.

The data collected by the reluctance sensor may be transmitted through an electrical conductor with or without slip rings or other rotational electrical couplings. In another embodiment, the data may be transmitted via a short hop wireless communication to a long haul telemetry system or a steering controller, such as a rotary steerable tool or a toolface control system on surface or downhole so that directional calculations, actuations, adjustments, or so forth may be implemented. A downhole device such as an orienting tool may be used on top of the BHA or the drilling motor that adjusts angular position of the toolface bend direction of the drilling motor in the desired direction for steering relative to the magnetizable target structure. The control of this steering by any of these surface, downhole steering, or orienting systems may be performed based on an automated response by the steering controller in response to the positional data received from the reluctance sensor such as keeping the steering on a desired intersection or follow trajectory. Hence, the sensor system 800 may be utilized in conjunction with an autonomous steering system where a pre-defined steering objective (e.g., intersection with a well or structure) is preprogrammed into the downhole or surface steering controller or reprogrammed from the surface as needed through instructions transmitted on a down linked telemetry system, on surface, or near the surface, such as a mud pulse telemetry system or other telemetry methods disclosed herein. The steering system may utilize data from the sensor system 800 to follow a path relative to the target well or intersect the target well at a desired depth. Formation data may also be referenced with offset data stored in the downhole steering assembly to track wherein the bottom of the hole is relative to a desired path and intersection point if applicable. Further, the steering controller may automate the intersection action when a favorable formation is sensed, such as a high compressive strength formation rather than a soft formation surrounding the target material.

The data read by the sensor system 800 may be transmitted to the surface and processed at the drilling site or offsite such as in a real-time operations center remotely located from the drilling site via a communications data network. Steering commands may be communicated back to the downhole assembly over a downlink communications telemetry system on surface or near the surface, such as through a mud pulse, wired pipe, electromagnetic telemetry, acoustic telemetry, torsion telemetry, seismic communications, or so forth. In another embodiment, the magnetic field may be generated by the use of electromagnets instead of the ring magnet 804.

In FIG. 8B, the sensor system 800 may include magnetometers 810. In one embodiment, the magnetometers 810 represent radially oriented sense axis magnetometers ideally aligned in an exact center portion between the two bucking magnets to sense the maximum bucking field radially extending from the sensor system 800. While an array of magnetometers 810 is shown in this embodiment. Only one magnetometer or gradiometer is needed if the near-bit sub housing the sensor system 800 is rotating and a tool face direction sensor (not shown) may be utilized to measure the profile of the magnetic field and thus the magnetic reluctance over the circumference of the sensor system 800 to determine magnitude and direction of the magnetic intensity or the magnetic gradient in an azimuthal manner. In general the toolface direction sensor may be measured using two orthogonally oriented accelerometers, for example, one each on either the X or Y cross longitudinal axis direction. These accelerometers may be used to sense the high side of an inclined hole. In another embodiment the sensor system 800 may adjust steering based on the sensed magnetizing field from the reluctance sensors.

Hence, the use of a number of magnetometers 810 may eliminate the need for a directional reference since a sensed azimuthal profile of the magnetizing field from the ferrous material may be sensed. In another embodiment, the sensor system 800 may reference a home position of the drill tool or steering assembly, such as a bend direction of the steering assembly. As a result, the need for a high side or magnetic reference may be eliminated and replaced with a position sensor that monitors the orientation of the drive shaft 806 relative to a default, home, or starting point of the rotational path of the shaft. For example, a Hall effect sensor may be wired to the drive shaft 806 and then to the processor of the sensor system 800 to determine at what point in rotation the sensor is at relative to the tool face of the steering tool. The magnetometers 810 may use the sensed change in the background earth magnetic field as rotation progresses to determine where in the rotation each magnetometer 810 is to resolve the direction of the target object relative to the tool face of the steering tool. A directional reference sensor may also be combined with the magnetometers 810 when the rotation is stopped by triangulating and resolving where the peak field strength is sensed to be by the magnetometers 810. A directional reference sensor, such as a gyroscope may also be used to aid on maintaining an orientation relative a fixed direction. The sensor system 800 may utilize this information to determine a direction to the target relative to the high side of the drilling tool or other reference point.

The magnetometers 810 may be designed to measure an azimuthal magnetic field strength profile around the circumference of the tool to facilitate a non-rotation condition, such as a Hall Effect sensor, coil loop, or a flux gate designed for high magnetic field strengths. In another embodiment, the sensor system 800 may employ an AC only sensor that responds only to the rate of change of the external magnetic field. For example, the sensor may utilize an induction sense coil winding co-axial with the direction of the polarizing magnetic field coming from the magnetic source in the reluctance sensor. As the drill bit sweeps across high and low magnetically permeable zones, an inductive response is created in the coil windings which may then be routed to the sensor electronics. The higher the rate of change of magnetic flux density across the cross axis of the sensing coil, the more electromotive force (EMF) is induced in the coil resulting in more current and a greater voltage for the sensor circuitry to sense. The sensor system 800 may also be configured to monitor the revolutions per minute (RPM) of the drive shaft 806 to know how vast the magnetometers 810 or other sensing coils are passing through the varying magnetic flux due to the presence of a magnetizable target.

In FIG. 8C, the sensor system 800 may include gradiometers 812. The gradiometers 812 may represent pairs of radially spaced and radial sense co-alignment magnetometers in a direction in the cross plane of the longitudinal axis of the tool. The distance between the matched gradiometers 812 may be optimized for each part to measure the radial gradient field where there is peak sensitivity to changes in the radial field strength. For example, the inner magnetometers of the gradiometers may be placed in a position where a sizeable portion of the radial magnetic field exists. In another embodiment, the utilization of the magnetometers 810 or gradiometers 812 may be utilized to perform dynamic ranging. The sensor system 800 may also be utilized with an active ranging system that uses AC electric current excitation in the target material which then emits a characteristic magnetic field in the circumference direction of the electric current flow direction. The sensor system 800 may be utilized to sense the magnetic field from the current flowing on the target from the external excitation source. As a result, the sensor system 800 may be a combination device.

FIG. 9 is a schematic, magnetic circuit representation of a sensor system 900 in accordance with the disclosed embodiments. An air gap is a resistance to the flow of magnetic flux flowing in a highly magnetically permeable material, such as the permanent magnets or magnetically permeable metal of a tubular which may represent a target 902. The magnetic intensity (H) of the permanent magnets 904 may be controlled. The two magnetic flux sources, represented by electromagnets 904 may buck in the middle forcing the flow of flux out in the a first gap (G1) which may represent a radial launch of the bucking field away from the drilling tool. The electromagnets may also be replaced with permanent magnets in the same polar orientation. The orientation of the poles may be inconsequential so long as both of the north poles or both of the south poles of the permanent or electromagnets are converging together in the magnetic circuit. In another embodiment, one magnetic source may be a permanent magnet while the other magnetic source may be an electromagnet. Alternatively, a magnetic source may be a combination of a permanent magnet and an electromagnet.

A portion of the magnetic circuit of the sensor system 800 may include the magnetic source on the source side of the circuit. In this case, the magnetic flux may be directed or redirected around the magnetic circuit using preferably highly magnetically permeable material, such as soft iron to route the magnetic flux to a desired exit and entry point in the magnetic circuit. In the examples shown thus far, there has been no addition of permeable material in the magnetic circuit other than the magnetic source itself. This is not to say, however, that the magnetic flux may not be routed into a desired direction by flowing the flux through a magnetically permeable material in the sensor. See for example in FIG. 6B which shows the extendable pad 618 containing the magnetometer 616, a portion of magnetically permeable material may be placed in front of or behind the magnetometer 616 to reduce the flux gap losses and concentrate more flux through the sensing axis of the magnetometer 616 and the magnetic permeable guides 620 of FIG. 6D as well.

Figure 8D:
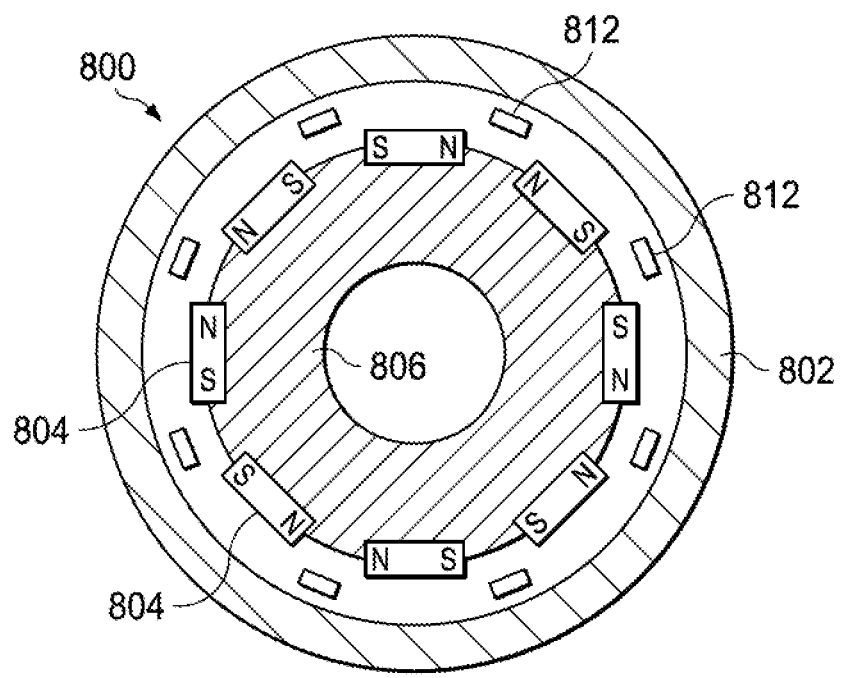

Turning now to FIG. 8D, the housing 802 and drive shaft 806 may be formed of a non-magnetic material, such as Austenitic stainless steel, Inconel, or other materials utilized for load bearing bottom hole assemblies. The non-magnetic materials may be utilized so that the target object is the only component to reduce the magnetic circuit loop resistance of the magnetic field of the sensor system 800 as the target comes into or leaves from the sensor range of the sensor system 800. As a result, the housing 802 and the drive shaft 806 do not significantly affect the magnetic field. As shown, the ring magnets 804 may be radially positioned around the drive shaft 806. The gradiometers 812 may be positioned between the ring magnets 804 to better sense changes in the magnetic flux.

Turning again to FIG. 9, the magnetic flux flows through the low magnetically permeable gap of drilling fluid and the formation until it reaches the highly magnetically permeable material of the target 902 where the resistance to the magnetic flow of flux is very low in comparison (e.g., typically 1000-3500 times better). Lower gaps 906 and 908 (G2 and G3) is wherein the flux leaves the target 902 and returns back through a lower and upper side of the sensor system 900 which in this case is the South pole between the magnets 904 (e.g., an upper and lower permanent magnet). It should be understood that a magnetometer may also be positioned in the lower gaps G2 and G3 906 and 908, but as one can see the flux density in G2 and G3 906 and 908 is less, thus, the G1 position offers the best location for flux density and thus sensing a change in the magnetic circuit flux intensity or gradient.

In one embodiment, by placing a magnetometer 901 in the G1 position just as the bucking field extends radially, the sensor system 900 may then monitor changes in reluctance, gap distance, or magnetic material bulk of the target 902 by determining how much flux density or magnetic field strength changes at this position. For example, as the air gap increases, the flux density may decrease. Variations in the magnitude in flex density sensed through the sensor system 900 may be utilized to determine relative and absolute distance to the target 902. To obtain absolute distance may require knowledge of the shape and magnetic permeance of the target 902. The distance to the target 902 as sensed and calculated by the sensor system 900 may be utilized to take any number of steering or avoidance actions.

In one embodiment, the magnetometer 901 may be placed on a bucking side essentially doubling the flux density from the magnets 904 passing through that side of the sensor system 900. The orientation of the poles of the magnetic fields may be altered to create an azimuthal sensitivity for the magnets 904 that may affect a magnetizable material in the target 902. In one embodiment, the bucking field provides a method of targeting a specific direction or object with or without rotation of the sensor system 900. In another embodiment, utilizing a single cross axis magnet may be utilized to determine the distance and direction to the target 902.

The sensor system 900 may utilize an algorithm for subtracting the neutral field from the measured field to give a user or system an indication of components of a sensed signal that are from the magnetizing effects of the magnetizable materials in the target as compared to the static shape of the magnetic field imposed by the reluctance sensor. Hence, only the magnetizing field is used in the calculation and the polarizing field is removed from the calculation since it is known. The polarizing field may be best determined when the sensor system 900 is in an environment where there is no magnetizable material nearby that would create a magnetizing field. This reading or value may be utilized to establish a compensation, bias, or nulling value for the sensor which can be subtracted from future measurements.

Figure 10:
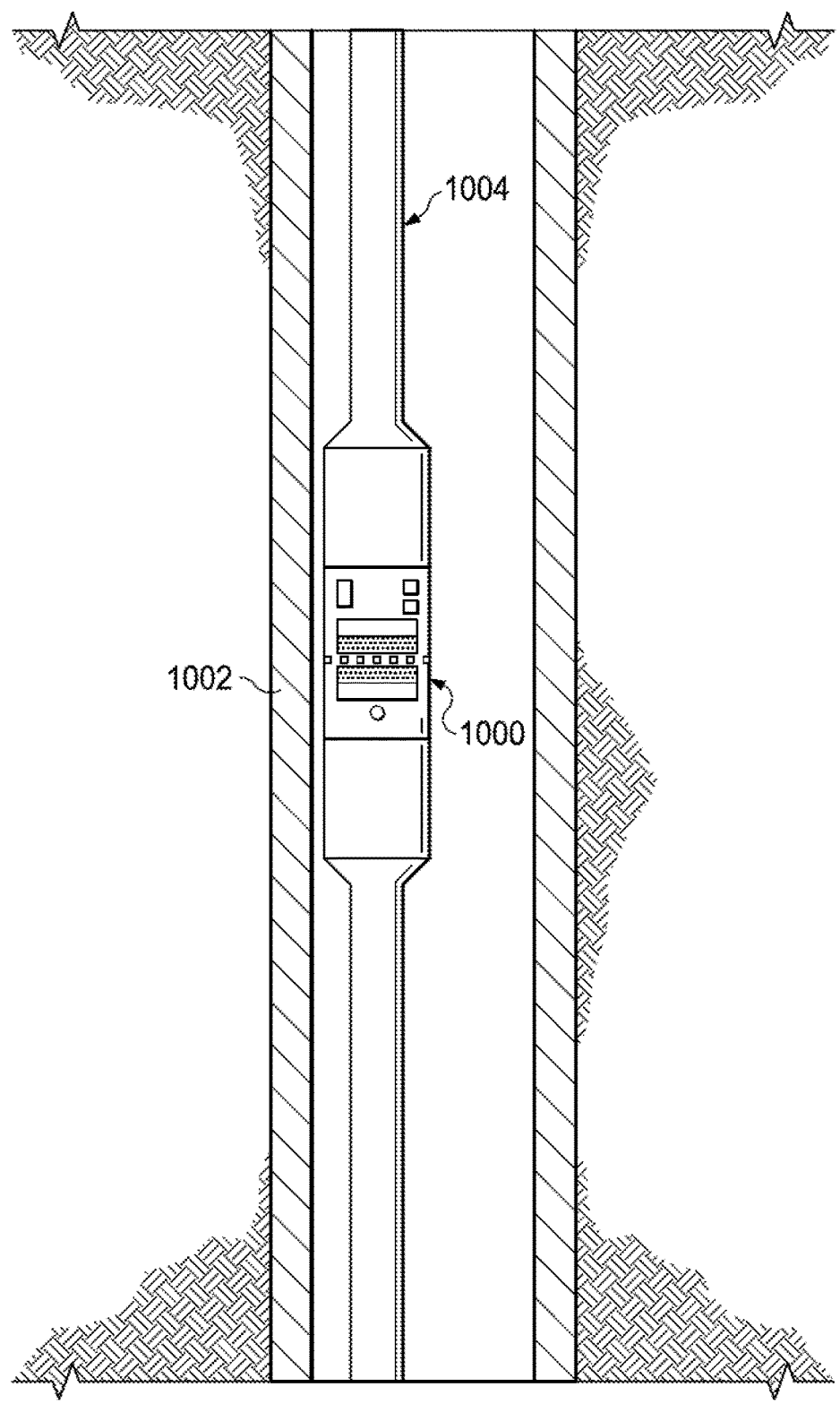
FIG. 10 is a schematic, representation of a downhole sensor system within a casing in accordance with the disclosed embodiments.

FIG. 10 is a schematic, representation of a downhole sensor system 1000 within a tubular 1002. In one embodiment, the tubular 1002 may represent a casing or liner. The sensor system 1000 may be placed anywhere within a drill string 1004. For example, the sensor system 1000 may be placed above a steering assembly or further up in the drill string 1004 to help monitor wear on the tubular 1002 especially in the casing or liner of "while-drilling" applications where the casing or liner is reciprocated. In one embodiment, the sensor system 1000 is azimuthal and may look for signs of eccentric or concentric wear in the tubular 1002 from the drill string 1004 as the hole depth in the wellbore increases and the tubular 1002 experiences increased abrasion from friction on the bore wall.

In one embodiment, the sensor system 1000 may include a number of sensors or systems at a desired intervals or positions along the drill string 1004. For example, the distinct sensor systems may be utilized to monitor casing/liner wall thickness. In conventional drilling with the drill string the casing or liner is stationary. As metal in the tubular 1002 is worn off by the rotating drill string, the strength of the permeance (inverse of reluctance) of the magnetizing field from the casing or liner is diminished. As a result, determinations of thickness or changes in thickness may be performed by the difference in magnetizing field resulting from the metal being rubbed or shaved away from the tubular 1002. In one embodiment, the thickness of the casing is logged and utilized to measure and anticipate future issues or failures. For example, the measured casing thickness may be measured at specific depths within the casing and these values may be compared to previous measurements or expected responses to detect the absence of ferrous material which is indicative of casing wear (e.g., higher reluctance, lower permeance detected by the magnetic circuit of the sensor system 1000).

For example, FIG. 10 illustrates a typical key seat profile where the drill string 1004 including various pipes and interconnected components is rubbing one side of the tubular 1002 and wearing it down. The sensor system 1000 may have a model for the expected permeance of the casing or may be measured in a new or competent section of a casing first (as a default or golden standard) and then a reduction of the permeance of the rest of the tubular 1002 may be measured to calculate deterioration and wear. This wear information may be utilized to make changes to the drilling operation to stop drilling and put in place measurements, devices, systems, or processes to protect the tubular 1002 from further damage if the amount of damage begins to approach threshold levels that indicate potential danger or permanent damage beyond acceptable limits. The sensors may be positioned throughout the drill string 1004 to monitor changes in the permeance and repeatedly measure areas with a new sensor system as drilling continues to compare results from the first pass with the next pass to see if any notable changes have occurred. This information may be utilized to determine how the drill string is riding within the tubular 1002.

In one embodiment, the sensor system 1000 may be referred to as a caliper. The sensor system 1000 may be used to measure the relative standoff (or distance between) of the reluctance sensor of the sensor system 1000 from the tubular 1002 to account for being off center as is shown in FIG. 10 to get a better image of the wall thickness of the tubular 1002 for a full 360 degree view and analysis of the tubular 1002.

A telemetry or communications module in communication with or integrated with the sensor system 1000, such as wired drill pipe, may be individually address each sensor in the drill string on a data network and communicate the measurements and readings from each sensor to the surface or another location in the drill string, such as the MWD/LWD system in the BHA. In another embodiment, a wireline tool may be inserted within the wellbore to interrogate the sensor system 1000 through a wireless connection (e.g., inductive coupling, Bluetooth, radio frequency, near field communications, WiFi, etc.) for recorded data. For example, a dart carrying a communication interface to sensor system 1000 and having data storage capabilities may be pumped to the depth of each the sensor system 1000 to retrieve the data then later retrieved after all desired sensors have been interrogated and data retrieved from them. The measurements taken by the sensor system 1000 may be communicated through the drill string 1004, using wired drill pipe, wirelessly, seismically, acoustically, magnetically, electromagnetically, torsionally or utilizing any number of other communications methods applicable to downhole tools. In one embodiment, each sensor system 1000 may include a telemetry or communications module for periodically transmitting data, information, and measurements to the surface.

Figure 11:
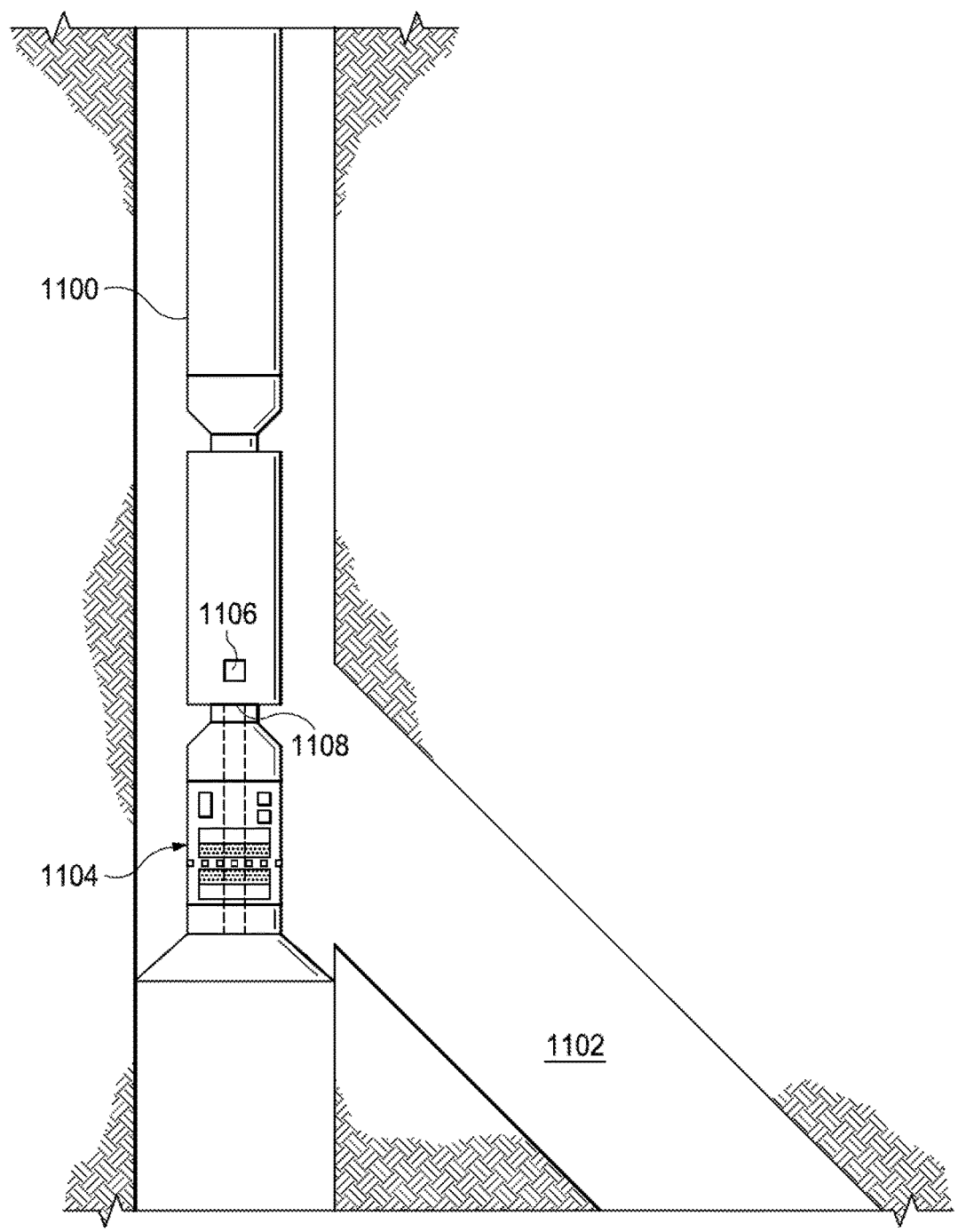
FIGS. 11 and 12 are schematic, representations of a steerable drilling tool being utilized with a branched well in accordance with the disclosed embodiments.
Figure 12:
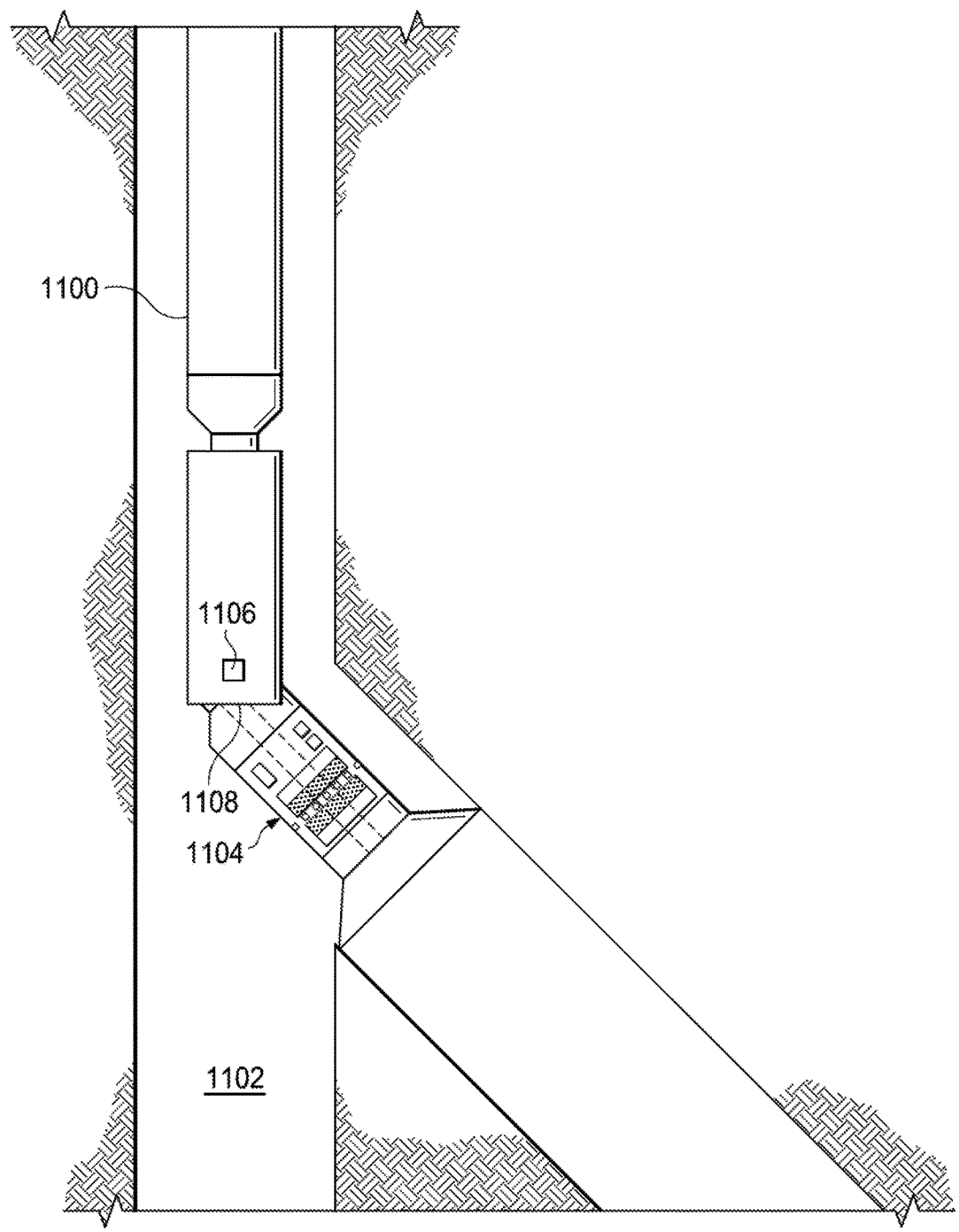

Turning now to FIGS. 11 and 12 are a schematic, representation of a steerable drilling tool 1100 or hole finder tool being utilized with a branched well 1102 in accordance with the disclosed embodiments. One embodiment, a sensor system 1104 may be configured to find an orientation of an aperture in the casing of the branch 1102 often called a multilateral window. For example, as shown in FIGS. 11 and 12 the branch 12 1102 may include a branch that separates from the main bore. The sensor system 1104 including one or more magnetometers 1106 or gradiometers may be alternatively be placed differently, such as above a pivot arm 1108, as part of a housing, motor, or other drill string component.

Detection of the branch may allow the tool 1100 to be oriented to enter the branch. For example, the operator may be able to avoid having a bend in the mud motor of the steerable drilling tool 1100, such as a down hole adjustable bent housing or a work over tool may be pointed toward the branch. In other embodiments, other assemblies besides steerable assemblies may be run with this sensor to aid completions equipment, work over equipment, cementing equipment, fracturing equipment or any other temporary or permanent install equipment to be selectively guided into or away from a lateral junction. The sensor system 1104 may also be utilized to detect where a casing collar is in the target well which may be utilized for recording, depth tracking, or information generation. For example, the information may be utilized to create a three dimensional model or database of available information about the branched well. Likewise the sensor system 1104 may be used to detect casing collars when the sensor is in an adjacent bore to the target well and in this manner track the depth of the sensor relative to the target well.

Figure 13:
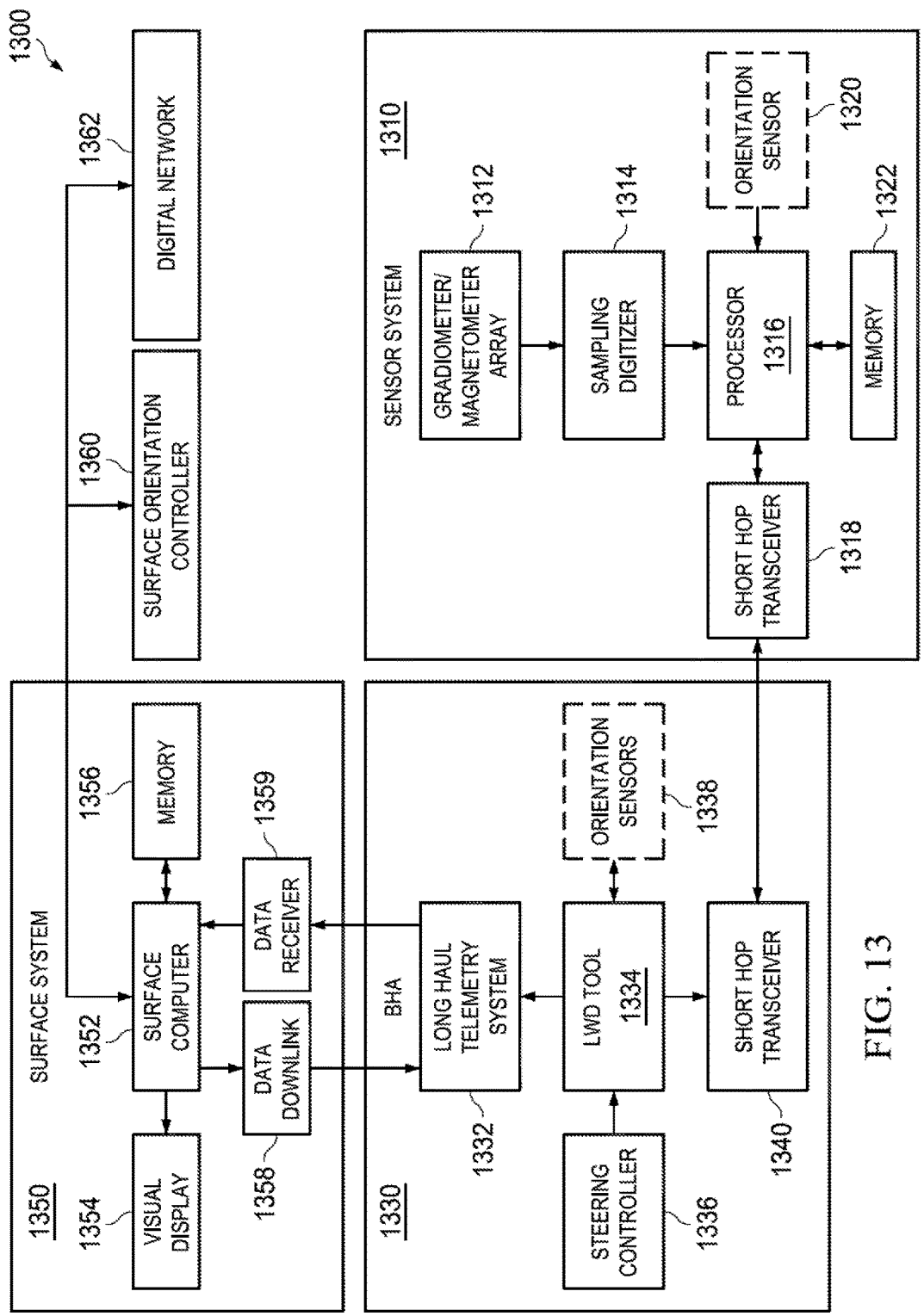
FIG. 13 is a block diagram of a drilling system in accordance with the disclosed embodiments.

FIG. 13 is a block diagram of a drilling system 1300 in accordance with the disclosed embodiments. In one embodiment, the drilling system 1300 may include a number of components including at least a reluctance sensor system 1310, a bottom hole assembly 1330, and a surface system 1350.

The various components of the reluctance sensor system 1310, bottom hole assembly 1330, and surface system 1350 may be connected by pins, wires, traces, communications connectors, leads, fiber optics, or other communications or conductive components. In another embodiment, all or a portion of the acoustic tool may be integrated in a single circuit or ASIC.

The bottom hole assembly 1330 may include a long haul telemetry system 1332, a logging while drilling tool 1334 (or MWD, SWD, logging only, etc.), a steering controller 1336, orientation sensors 1338, and a short hop transceiver 1340.

The surface system 1350 may include a surface computer 1352, a visual display 1354, a memory 1356, a data downlink 1358, and a data receiver 1359. The surface system 1350 may further communicate with a surface orientation controller 1360 and a digital network 1362.

The reluctance sensor system 1310 may include at least one gradiometer/magnetometer or a gradiometer/magnetometer array 1312 (making up the reluctance sensor sensing portion), a sampling digitizer 1314, and sensor system processor 1316, a short hop transceiver 1318, orientation sensors 1320, and a memory 1322. As shown the gradiometer/magnetometer array 1312 may include a single array of magnetometers or a paired set of gradiometers disposed proximate one another about the periphery of the reluctance sensor system 1310.

The sensor system processor 1316 may represent one or more processing units or a microcontroller. A microcontroller is a small computing component on a single integrated circuit including, for example, a processor, core, memory, and programmable input/outputs. In one embodiment, the microcontroller may be an application-specific integrated circuit (ASIC) or field programmable gate array (FPGA).

The sensor system processor 1316 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The sensor system processor 1316 may be a single chip or integrated with other computing or communications elements. The sensor system processor 1316 and other components of the sensor system 1302 may be hardened for downhole conditions including shock, temperature, and pressure resistance, water proof or resistant, and so forth.

The sensor system processor 1316 or other component of the reluctance sensor system 1310 may control operation of a drill tool by sending commands for changing direction, altering rotation speed, decoupling, stopping or starting one or more motors, bits, cutting tools, or rotation devices, or sending other commands or instructions to components of the drilling system 1300. The commands may be made based on changes in parameters or measurements of the magnetic field intensity, reluctance, permeance, magnetic flux density, or other parameters.

The memory 1322 is a hardware element, device, or recording media configured to store data for subsequent retrieval or access at a later time. The memory 1322 may be static or dynamic memory. The memory 1322 may include a hard disk, random access memory, cache, removable media drive, mass storage, or configuration suitable as storage for data, instructions, and information. In one embodiment, the memory 1322 and sensor system processor 1316 may be integrated. The memory may use any type of volatile or non-volatile storage techniques and mediums.

The sampling digitizer 1314 may be configured to digitize data samples read by the gradiometer/magnetometer array 1312. In one embodiment, the sampling digitizer 1314 may include analog-to-digital converters that convert the signals received from the gradiometer/magnetometer array 1312 into digital signals that may be processed by the sensor system processor 1316.

The orientation sensor 1320 may include any number of accelerometers, levels, compasses, gyroscopes, rotation rate sensors, home position sensors and other sensors for determining the orientation of the sensor system 1310 including additional portions of a drill string.

The short hop transceiver 1318 may be configured to communicate with the bottom hole assembly through a wired or wireless connection. The short hop transceiver 1318 communicates data with the short hop transceiver 1340. The data may be raw data or processed data based on the configuration of the sensor system 1310. In one embodiment, the data is processed so that the steering controller 1336 may make automatic adjustments the direction, speed, and orientation of the sensory system (including a drill or milling bit) based on the data.

The LWD tool 1334 may include any number of components typically utilized downhole. The long haul telemetry system 1332 may be configured to communicate with the data receiver 1359 of the surface system 1350 and the data downlink 1358. The communications may be performed through wireline systems, the drill string, wirelessly, acoustically, magnetically, or utilizing any other communications system suitable for communicating with the bottom hole assembly 1330 when positioned downhole. In another embodiment, the data receiver 1359 and the data downlink 1358 may represent a single transceiver.

The orientation sensors 1338 may similarly determine the direction, orientation, and position of the bottom hole assembly 1330. The steering controller 1336 is one or more downhole tools for steering the drill string including the bottom hole assembly 1330 and the sensor system 1310 with the corresponding drill bit. For example, the steering controller 1336 may be a rotary steerable tool for downhole directional drilling and exploration. The steering controller 1336 may be configured to rotate, bend, actuate, or otherwise change directions, positions, and orientation. The steering controller 1336 may function automatically or based on operator instructions received from the surface computer 1352, surface orientation controller 1360 or devices in communication with the surface computer 1352 through the digital network 1362.

The surface computer 1352 may represent one or more networked computing and communications devices. The surface system 1350, bottom hole assembly 1330, and sensor system 1310 may execute specific sets of instructions, programs, steering or avoidance algorithms, or so forth. In other embodiments, ASICs, programmable logic, or hardware may be utilized to implement the described processes.

The visual display 1354 may be a computer monitor, television, tablet computing device, smart glass, heads up display, or other visual display device. Any number of other peripherals may also be utilized with the drilling system 1300. The memory 1356 (as well as the other memories of the drilling system 1300) may be utilized for temporary or long term storage. For example, the memory 1356 may include one or more databases for storing data received from the sensor system 1310 for utilization by the various devices and components of the drilling system 1300 as well as for subsequent recording and simulation purposes.

The surface orientation controller 1360 may represent any number of controllers for controlling all or portions of the surface system 1350, bottom hole assembly 1330, and the sensor system 1310. For example, the surface orientation controller 1360 may be utilized to control a mud motor. The digital network 1362 may include any number of wired, wireless, private, public, or other networks. Any number of connected systems, devices, or equipment may communicate with the drilling system 1300 utilizing the digital network 1362.

In addition to the embodiments described above, many examples of specific combinations are within the scope of the disclosure, some of which are detailed below.

Example 1

A drilling apparatus that includes a drill bit; a steering controller that steers the drill bit; a downhole steering system coupled to the drill bit and comprising a steering controller; a reluctance sensor system comprising at least one sensor and two or more magnets positioned to create a bucking effect; and a surface computer communicably coupled to the at least one sensor and the steering controller, where the surface computer contains a set of instructions that, when executed by the surface computer, cause the surface computer to receive magnetic flux measurements from the sensor, determine a distance or direction to a target object based in part on the magnetic flux measurement; and transmit the determined distance or direction to the steering controller.

Example 2

The drilling apparatus according to example 1, wherein the bit is a milling bit.

Example 3

The drilling apparatus according to example 1 or 2, wherein the reluctance sensor system is integrated with the drill bit.

Example 4

The drilling apparatus according to example 1, 2 or 3, wherein the surface computer determines an azimuthal profile associated with the changes in magnetic flux to determine a direction of the drill bit relative to the target object.

Example 5

The drilling apparatus according to example 1, 2, 3 or 4, wherein the two or more magnets creating a bucking effect for extending the magnetic field radially from a longitudinal axis of the drilling apparatus.

Example 6

The drilling apparatus according to example 1, 2, 3, 4 or 5, wherein the two or magnets are connected to actuators for positioning the two or magnets relative to each other in response to commands from the surface computer.

Example 7

The drilling apparatus according to example 1, 2, 3, 4, 5 or 6, wherein the reluctance sensor system including a housing of the reluctance sensor is formed of a non-magnetic material.

Example 8

The drilling apparatus according to example 1, 2, 3, 4, 5, 6 or 7, wherein the reluctance sensor system includes an array of gradiometers for sensing the changes in the magnetic flux.

Example 9

The drilling apparatus according to example 1, 2, 3, 4, 5, 6, 7, or 8, wherein the steering controller utilizes the change in magnetic flux to steer the drill bit toward the target object for autonomous intersection.

Example 10

A sensor system that includes a plurality of magnets positioned to generate a magnetic field with a bucking effect; a plurality of magnetometers; a magnetic field master controller communicably coupled to the plurality of magnetometers, where the magnetic field master controller contains a set of instructions to receive measurements from the magnetometers corresponding to changes in reluctance of a magnetic flux of the magnetic field generated by the plurality of magnetics, and to determine a distance or direction to a target object based on the magnetic flux measurements; and a transceiver for communicating the distance.

Example 11

The sensor system according to example 10, further comprising one or more orientation sensors for determining an orientation of the sensor system.

Example 12

The sensor system according to example 10 or 11, wherein the sensor system rotates with a connected drill bit.

Example 13

The sensor system according to example 10, 11 or 12, wherein the sensor system communicates with a bottom hole assembly including a steering controller for guiding a drill bit.

Example 14

The sensor system according to example 10, 11, 12 or 13, wherein the magnetic field master controller determines an azimuthal profile associated with the changes in reluctance of the magnetic field to determine a direction to the target object.

Example 15

A method for steering a drill bit in a downhole tool, the method comprising generating a magnetic field utilizing two or more permanent magnets of a reluctance sensor system, wherein a same pole of the two or more permanent magnets face each other to create a bucking effect; measuring changes in magnetic flux utilizing the reluctance sensor system; determining a proximity to a target object in response to changes in the magnetic flux; and steering the drill bit in response to the proximity to the target object.

Example 16

The method according to example 15, further comprising determining a direction and orientation of the drill bit.

Example 17

The method according to example 15 or 16, wherein the determining is performed utilizing a polar plot associated with the changes in magnetic flux.

Example 18

The method according to example 15, 16 or 17, wherein the reluctance sensor system is integrated with the drill bit.

Example 19

The method according to example 15, 16, 17 or 18, further comprising utilizing a bucking effect to extend the magnetic field radially from a longitudinal axis of the sensor system

Example 20

The method according to example 15, 16, 17, 18 or 19, wherein steering further comprises intersecting the target object utilizing the changes in magnetic flux.

In the previous embodiments, reference is made to the accompanying drawings that form a part hereof. These embodiments are described in sufficient detail to enable those skilled in the art to practice the invention, and it is understood that other embodiments may be utilized and that logical, structural, mechanical, electrical, and chemical changes may be made without departing from the scope of the invention. To avoid detail not necessary to enable those skilled in the art to practice the embodiments described herein, the description may omit certain information known to those skilled in the art. The detailed description is, therefore, not to be taken in a limiting sense, and the scope of the illustrative embodiments is defined only by the appended claims.

In the drawings and description that are included, the drawing figures are not necessarily to scale. Certain features of the invention may be exaggerated in scale or in somewhat schematic form and some details of conventional elements may not be shown in the interest of clarity and conciseness.

The previous detailed description is of a small number of embodiments for implementing the invention and is not intended to be limiting in scope. The following claims set forth a number of the embodiments of the invention disclosed with greater particularity.

The invention claimed is:

1. A drilling apparatus comprising:
   a drill bit;
   a downhole steering system coupled to the drill bit and comprising a steering controller;
   a reluctance sensor system comprising at least one sensor and two or more magnets positioned to create a bucking effect on the shape of a magnetic field coming away from the magnets, wherein the sensor is positioned and configured to measure changes in a magnetic flux of the magnetic field; and
   a surface computer communicably coupled to the at least one sensor and the steering controller, where the surface computer contains a set of instructions that, when executed by the surface computer, cause the surface computer to receive magnetic flux measurements from the sensor, determine a distance or direction to a target object based in part on the magnetic flux measurements, and transmit the determined distance or direction to the steering controller, and wherein the steering controller utilizes the changes in magnetic flux to steer the drill bit toward the target object for autonomous intersection.

2. The drilling apparatus according to claim 1, wherein the bit is a milling bit.

3. The drilling apparatus according to claim 1, wherein the reluctance sensor system is integrated with the drill bit.

4. The drilling apparatus according to claim 1, wherein the surface computer determines an azimuthal profile associated with the changes in magnetic flux to determine a direction of the drill bit relative to the target object.

5. The drilling apparatus according to claim 1, wherein the two or more magnets are connected to actuators for positioning the two or more magnets relative to each other in response to commands from the surface computer.

6. The drilling apparatus according to claim 1, wherein the reluctance sensor system includes an array of magnetometers, and wherein the reluctance sensor system is utilized during rotation of the drill bit.

7. The drilling apparatus according to claim 1, wherein the reluctance sensor system includes a housing formed of a non-magnetic material.

8. The drilling apparatus according to claim 1, wherein the reluctance sensor system includes an array of gradiometers for sensing the changes in the magnetic flux.

9. A method for steering a drill bit in a downhole tool, comprising:
   generating a magnetic field utilizing two or more permanent magnets of a reluctance sensor system, wherein a same pole of the two or more permanent magnets face each other to create a bucking effect on the shape of the magnetic field;
   utilizing the bucking effect to extend the magnetic field radially from a longitudinal axis of the reluctance sensor system;
   measuring changes in a magnetic flux of the magnetic field utilizing the reluctance sensor system;
   determining a proximity to a target object in response to changes in the magnetic flux; and
   steering the drill bit in response to the proximity to the target object.

10. The method according to claim 9, further comprising determining a direction and orientation of the drill bit.

11. The method according to claim 9, wherein the determining is performed utilizing an azimuthal profile associated with the changes in magnetic flux.

12. The method according to claim 9, wherein the reluctance sensor system is integrated with the drill bit.

13. The method according to claim 9, wherein steering further comprises intersecting the target object utilizing the changes in the magnetic flux.

* * * * *